MAGNETIC DRUM DIAL PULSE RECORDING AND STORAGE REGISTERS

Filed Jan. 27, 1951 11 Sheets-Sheet 1

INVENTORS C. E. BROOKS
J. H. MC GUIGAN
O. J. MURPHY

BY William F. Simpson.

ATTORNEY

MAGNETIC DRUM DIAL PULSE RECORDING AND STORAGE REGISTERS

Filed Jan. 27, 1951 11 Sheets-Sheet 2

INVENTORS C. E. BROOKS
J. H. MC GUIGAN
O. J. MURPHY
BY William F. Simpson.
ATTORNEY INVENTORS C.E. BROOKS
J.H. MC GUIGAN
O.J. MURPHY
BY William F. Simpson
ATTORNEY INVENTORS C. E. BROOKS
J. H. MC GUIGAN
O. J. MURPHY
BY William F. Simpson.
ATTORNEY

MAGNETIC DRUM DIAL PULSE RECORDING AND STORAGE REGISTERS

INVENTORS C. E. BROOKS
J. H. MC GUIGAN
O. J. MURPHY
BY William F. Simpson.
ATTORNEY March 13, 1956 C. E. BROOKS ET AL 2,738,382

MAGNETIC DRUM DIAL PULSE RECORDING AND STORAGE REGISTERS

Filed Jan. 27, 1951 11 Sheets-Sheet 6

INVENTORS C. E. BROOKS
J. H. MC GUIGAN
O. J. MURPHY

BY William F. Simpson.

ATTORNEY

INVENTORS C. E. BROOKS
J. H. MC GUIGAN
O. J. MURPHY
BY William F. Simpson
ATTORNEY

MAGNETIC DRUM DIAL PULSE RECORDING AND STORAGE REGISTERS

INVENTORS C. E. BROOKS
J. H. MCGUIGAN
O. J. MURPHY

BY William F. Simpson.

ATTORNEY

MAGNETIC DRUM DIAL PULSE RECORDING AND STORAGE REGISTERS

Filed Jan. 27, 1951 11 Sheets-Sheet 9

INVENTORS C. E. BROOKS J. H. MC GUIGAN O. J. MURPHY

BY William F. Simpson

ATTORNEY

March 13, 1956 C. E. BROOKS ET AL 2,738,382

MAGNETIC DRUM DIAL PULSE RECORDING AND STORAGE REGISTERS

Filed Jan. 27, 1951 11 Sheets-Sheet 10

INVENTORS C.E.BROOKS
J.H.MC GUIGAN
O.J.MURPHY

BY William F. Simpson

ATTORNEY

MAGNETIC DRUM DIAL PULSE RECORDING AND STORAGE REGISTERS

Filed Jan. 27, 1951 11 Sheets-Sheet 11

INVENTORS C. E. BROOKS
J. H. MC GUIGAN
O. J. MURPHY

BY William F. Simpson
ATTORNEY

United States Patent Office 2,738,382

Patented Mar. 13, 1956

2,738,382

MAGNETIC DRUM DIAL PULSE RECORDING AND STORAGE REGISTERS

Chester E. Brooks, Montvale, John H. McGuigan, Summit, N. J., and Orlando J. Murphy, New York, N. Y., assignors to Bell Telephone Laboratories, Incorporated, New York, N. Y., a corporation of New York Application January 27, 1951, Serial No. 208,192

15 Claims. (Cl. 179—18)

This invention relates to electrical receiving devices, mechanisms, circuits and methods, and to electrical storing or registering mechanisms, circuits and methods.

More particularly, the invention appertains to improvements in the call receiving, storing and registering mechanisms, circuits and methods disclosed in a United States patent application of Brooks-Lovell-McGuigan-Murphy-Parkinson, Serial No. 183,636, filed September 7, 1950. In the above-identified copending application, preliminary pulses, as well as a single pulse representing the first dialed digit or symbol was not recognized but rather discarded.

An object of the present invention is to arrange a call receiver to respond to and record a single pulse representing the first digit or symbol of a called designation so that codes of the type comprising an initial single pulse representing the first symbol or character followed by two series of pulses having any desired number of pulses may be recorded for later use. Such codes are sometimes referred to as being of the type 1XX.

Another object of this invention is to provide circuits, apparatus and method for responding to, recognizing, and recording the initial dialed digit of any predetermined value such as zero as a complete calling signal as is frequently employed in telephone systems for calling an operator.

Another object of this invention is to provide circuits, apparatus and methods for recognizing and responding to service codes of more than one and less than the maximum number of digits as a complete calling signal such as the type X11, for example, where X may comprise any digit from 1 to 9.

Due to the complexity and expense of the previous registers or sender circuits for receiving and storing telephone dial pulses, only a few such circuits are provided in most switching centers with the result that additional switching circuits are required for establishing paths from a calling line to the signal storing and register circuits.

A feature of the present invention is to provide call signal receiving, registering apparatus in which storing circuits sufficiently simple and inexpensive are provided that a register or storing means is provided individual to each of the subscribers' lines with the result that no waiting is required by the subscriber who may dial at any time and as soon as he desires to make a call without waiting for dial tone or other indication that the call receiving apparatus is ready to respond to the calling signals from the calling line.

Briefly, in accordance with the present invention, a magnetic recording device or rotating drum is provided. In the exemplary embodiment set forth herein the magnetic material employed for recording and storing signals comprises a layer upon a rotating drum. However, any suitably moving layer of magnetic material such as a disc, belt, etc. which moves in a closed or reentrant path may be employed equally well in combination with the circuits and other apparatus embodying this invention.

The drum comprises a cylinder of magnetic material or a surface layer of magnetic material thereon having so-called hard magnetic characteristics, i. e., permanent magnet characteristics in which the magnetic condition impressed thereon is retained until changed by other magnetic fields, forces or phenomena. Such magnetic properties are usually associated with relatively high coercive force and appreciable remanence or residual magnetic induction.

A plurality of coils comprising one or more windings on a ferromagnetic core structure are located adjacent the periphery of the magnetic drum and employed to apply a magnetic field to the magnetic material of the drum for changing its magnetic condition and also for responding to the magnetic field or condition of the drum.

In addition to the magnetic drum for recording magnetic conditions and permitting the recorded conditions to be recovered, a scanning mechanism is also provided for scanning the electrical condition of a plurality of calling lines or circuits which scanning mechanism in accordance with an exemplary embodiment of this invention comprises a cathode-ray tube having a plurality of targets in the end thereof and a sweep circuit for directing the beam of electrons successively over said targets.

Interconnecting and control circuits are provided for interconnecting, controlling and synchronizing the magnetic drum and recording apparatus and the scanning mechaism including the cathode-ray tube. The synchronizing circuits are arranged to cause the beam of the cathode-ray tube to fall upon the targets at the end of the tube in synchronism with the rotation of the magnetic drum in such a manner that each time the beam falls on any predetermined one of the targets of the cathode-ray tube, the magnetic drum will be in the same given position. The portions of the magnetic drum under the pick-up and recording coils when the cathode-ray beam is directed towards any given target are individual to and assigned to the particular line to which the target is interconnected and are employed for recording the electrical condition and the previous history of electrical condition of the line when a call is initiated over the line. Thus these elemental portions of the magnetic drum are always under the recording and pick-up coils when the electron beam falls upon a corresponding target. For convenience in referring to these elements, they are frequently called a "slot" and each one of the elemental elements is called a "cell."

In accordance with an exemplary embodiment of this invention each of a plurality of calling lines is tested or sampled in sequence by a distributor or scanning arrangement in which a cathode-ray tube is employed as the scanning mechanism or distributor. The output from the cathode-ray tube is employed to control the recording of signals in the magnetic material of a drum. Also signals previously recorded in the drum are also employed to control the recording of further signals.

In order to so employ the previously recorded signals it is desirable to employ a delay section on the drum as well as a main recording section so that the signals may be recovered or read from the main section at the same time or position of the main drum as the succeeding signals are recorded in the delay section of the drum. Equipment is also provided to respond to the recorded signals and indicate them as well as the line from which they were received. Each line is assigned a certain portion of the surface of the drum for controlling the recording of signals thereon and the drum and cathode-ray tube beam synchronized so that the signals from each line are recorded in the portions assigned to the respective lines.

The foregoing, as well as other objects and features of this invention, may be more readily understood from the following description when read with reference to the attached drawing in which:

Figs. 4, 5, 6 and 7 show in detail the various elements and the manner in which they cooperate to form a more comprehensive call recording system;

Figs. 9 and 10 show detailed circuits for indicating both the origin of a call and also the call signals comprising the call;

Fig. 18 shows the manner in which Figs. 1 and 2 are positioned adjacent one another;

Fig. 19 shows the manner in which Figs. 4, 5, 6 and 7 are positioned adjacent one another; and Fig. 20 shows the manner in which Figs. 9 and 10 are positioned adjacent one another.

Figure 1:
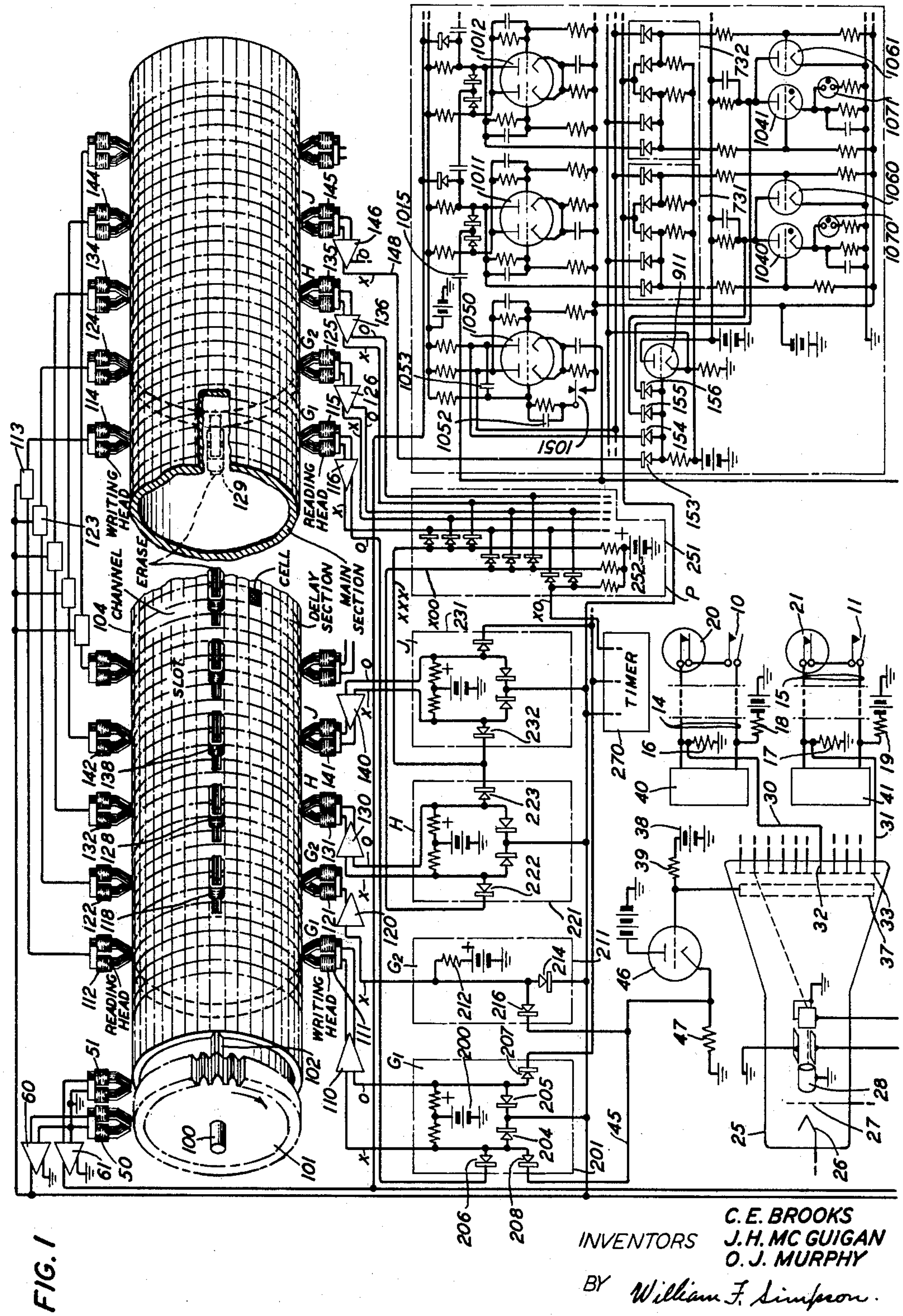
Figs. 1 and 2 show the details of a simplified embodiment of this invention.
Figure 18:
Figure 2:
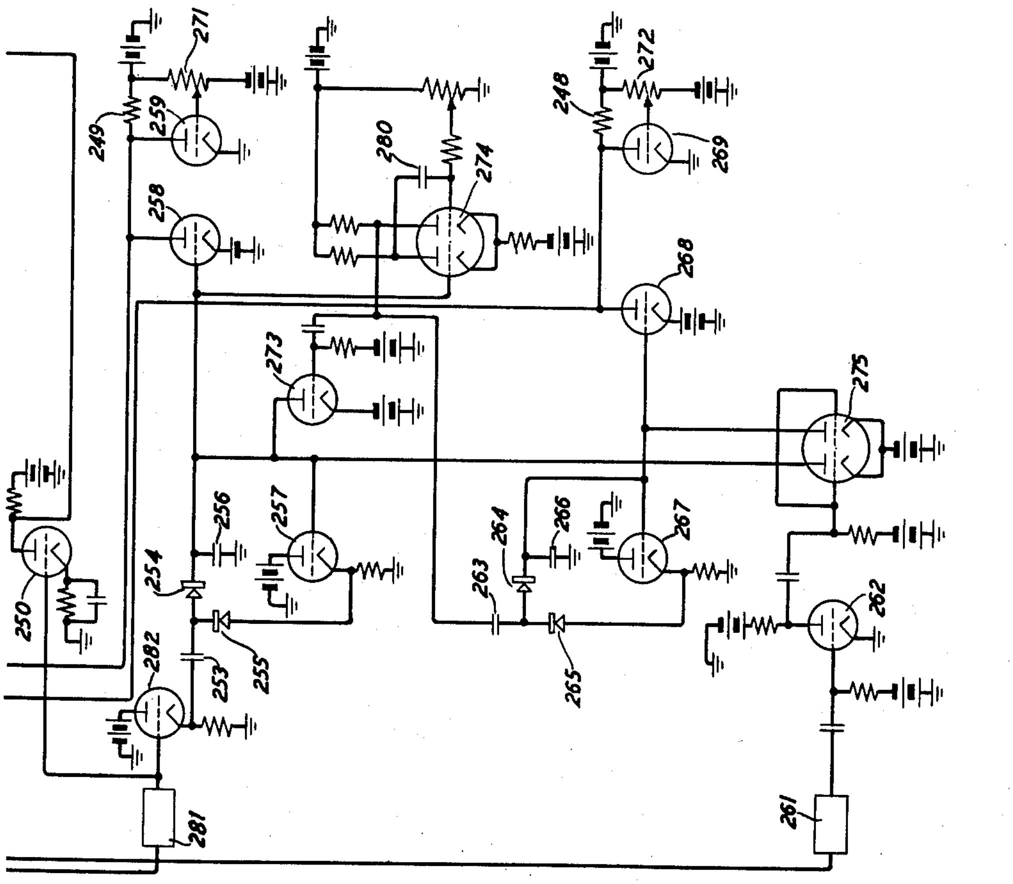

Figs. 1 and 2 when positioned as shown in Fig. 18 show an embodiment of this invention for receiving, recording and indicating a plurality of calls and their origin which is suitable for use as an annunciator call system, telephone call system or other types of calling systems and apparatus.

In the exemplary system set forth herein in detail each signal or indication comprises one or the other of two signaling conditions. One of these signaling conditions is called an X signal herein and the other of these signaling conditions is called an O signal. These two different signaling conditions, i. e., X signals and O signals, are represented by different currents or voltages or different voltage conditions or different current conditions in different circuits, conductors and terminals in the systems. These X and O signals may also be represented by different magnetic conditions in parts of the equipment. These signaling conditions most frequently comprise a voltage or current of one polarity i. e., positive or negative, of relative high large or maximum magnitude and a voltage or current of the same polarity but of relative low or minimum magnitude. When desirable these signaling conditions may be represented by other voltages or currents such as by positive and negative currents or voltages of the same or different magnitudes, or by current and no current—i. e., a current of zero magnitude or by a voltage and no voltage, etc.

Figure 11:
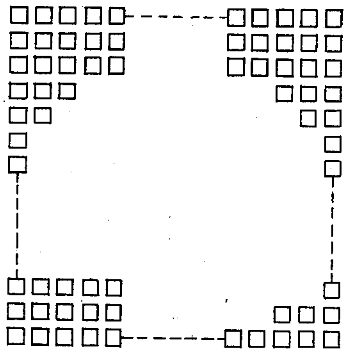
Fig. 11 illustrates a suitable array of targets or elements for the cathode-ray scanning tube.

Fig. 1 shows a cathode-ray scanning tube 25 in combination with the magnetic drum 104 and the manner in which these devices are interconnected, one with another, to record the calls which may be received over a plurality of calling lines from any of a plurality of calling stations. Fig. 2 shows the sweep circuits employed for causing the electron beam of the cathode-ray tube 25 to be successively stepped over a plurality of targets or electrodes at the end of the tube which electrodes are assigned to and connected to individual calling lines. Fig. 11 represents an end view of the cathode-ray tube showing a suitable arrangement of the targets or electrodes which are individually assigned and individually connected to the calling lines.

The cathode-ray tube 25 comprises a source of electrons such as a heater or heated cathode 26 and beam forming and control elements 27, 28 which elements represent the beam forming and focusing elements sometimes called the electron gun. After the beam is formed and focused by these elements and directed towards the end of the tube where the targets 32, 33, etc. are mounted, it passes between two pairs of deflecting plates, one for deflecting the beam in a horizontal direction and the other for deflecting the beam in a vertical direction.

While, as shown in the drawing, the deflecting means as well as the beam forming and focussing means comprise electrostatic elements, magnetic focussing and beam forming elements may be employed and magnetic deflecting elements may also be employed when desired. Also, any suitable combination of magnetic and electrostatic beam forming and focussing and deflecting elements may be employed when desired.

The deflecting and synchronizing circuit shown in Fig. 2 causes the beam to be progressively stepped from one target to the next, first falling upon each of the targets in one row and then being advanced step by step over each of the targets in the next row and so on. While the sweep circuits shown in Fig. 2 are arranged to advance the beam step by step, as pointed out above; when desired, suitable deflection control circuits may be employed which continuously advance the beam over the various targets at the proper rate of speed in synchronism with the rotation of the rest of the system.

In addition to the cathode-ray scanning tube 25 as shown in Fig. 1, a magnetic delay and recording drum 104 is provided. This drum is arranged to rotate on shaft 100 which coincides with the axis of drum 104.

The driving means for rotating the drum may comprise any suitable engine or motor. It is not essential that the speed of rotation of the driving means be accurately synchronized with any other rotating equipment.

The drum may be made of any suitable structural material including metals such as brass, aluminum, iron, steel, or stainless steel, etc. It may also be constructed of any insulating material including any of a large number of plastic materials. The drum is made in the form of a right circular cylinder and mounted on the shaft passing through its axis and arranged to rotate at a high speed on this shaft which shaft is in turn supported by suitable bearings. The surface of the drum, which is constructed to run true, has deposited thereon, or incorporated therein, magnetic material which may be in the form of a thin layer. The magnetic material may comprise magnetic powders or it may comprise magnetic alloys which in an exemplary embodiment of the invention comprises a thin layer of electrodeposited coating of electromagnetic material made up of an alloy of nickel and cobalt having a thickness in the range from 0.0003 inch to 0.0006 inch. However, other thicknesses may be employed with this or other magnetic materials or alloys.

A plurality of coils are mounted close to the surface of this drum but not in contact therewith.

These coils provide two different functions, one of recording the signals in the magnetic drum and the other of responding to the recorded signals. The coils which are employed to record in the magnetic drum are frequently called recording or writing coils or heads, while the coils employed to respond to recorded signals are frequently called pick-up or reading coils or heads. These coils or heads comprise a core structure having two pole-pieces separated by a small air gap, which pole-pieces extend very close to the surface of the drum, but are not in contact therewith. It is desirable that these pole-pieces extend at least to within a few thousandths of an inch or closer to the magnetic surface of the rapidly rotating magnetic drum.

One or more coils of wire are wound on these cores so as to produce a magnetic field within the core and across the air gap between the pole tips when energized by current for recording or writing on or within the magnetic drum. One or more coils of wire are also wound upon the pick-up coils which have the voltages induced therein when the signals recorded in the magnetic drum pass under its pole-pieces.

The circumferential area on the drum which passes immediately beneath the pole tips of a given recording coil is defined as a "channel." In addition to a recording or writing coil individual to each channel, the pick-up coil is also provided individual to each channel. The recording or writing coil changes the magnetic condition of the magnetic material of the drum which passes under its pole-pieces in accordance with the signals or currents supplied to the coils wound upon this recording head. The magnetic conditions thus recorded in the channel pass under a pick-up coil which has a core structure similar to the recording coil and causes the corresponding signal voltages to be induced in its winding.

The elemental part of the surface of the drum comprising an elemental portion of a channel of the drum as defined above, which is directly under or immediately adjacent the pole tips of a given recording head when a pulse of writing current is applied to the coils thereof, is frequently called a "cell" or elemental area and is employed for recording a single pulse in or on the drum. Where a multiplicity of the recording heads are employed as in the exemplary embodiment set forth herein, the aggregate of the "cells" or elemental areas which are under the several recording heads at any one instant of time, is frequently called a "slot." It is essential that the arrangement of the pick-up coils be similar to the arrangement of the recording coil so that all of the elemental areas forming a slot in addition to passing under all of the recording heads simultaneously, must also pass under all of the pick-up coils or heads simultaneously. A simple arrangement for a so-called slot has been assumed both in Fig. 1 and in Fig. 8 in order to more readily describe the structure of an exemplary embodiment of this invention and to more readily explain its mode of operation. The assumed arrangement of the slot is a rectangle running parallel with the axis of the cylinder on the surface of the drum. Thus, a cell comprises the portion of the surface of the drum common to a slot and to a channel. It is to be understood that slots are not limited to such rectangular areas but may comprise any complex pattern of areas on the surface of the drum depending upon the location of the various recording and pick-up coils adjacent the surface of the drum. It may be desirable to stagger the heads or coils in which case the slot may be in the form of a helix, a saw-tooth wave form or any other form of discontinuous or broken pattern or configuration.

A recording amplifier is provided for each recording coil and is provided with two input leads designated X and O. These amplifiers are normally biased so that substantially no current flows in the recording coil windings. When it is desired to record an X signal a high positive voltage with respect to ground is applied to the X input lead and when it is desired to record an O signal a high positive voltage with respect to ground is applied to the O input lead.

A pick-up or recording amplifier is also provided for each pick-up coil. The pick-up or reading amplifiers have two output leads or terminals, one designated X and the other O. In the exemplary embodiment of this invention described in detail herein, when O signals pass under the pole-pieces of the pick-up coil connected to the respective amplifiers, a low positive voltage is applied to the X output leads or terminals and a high positive voltage is applied to the O output terminals. When an X signal passes under the pole tips of a pick-up coil, a high positive voltage is applied to the X output terminal of the pick-up amplifier individual to said coil and a low positive voltage is applied to the O output terminal by the respective pick-up amplifier.

In addition to the pick-up and recording coils located adjacent the magnetic drum described above, additional pick-up coils such as 50 and 51 are provided for generating timing and synchronizing pulses. As shown in the drawing these coils are located adjacent the periphery of the timing wheel 101 which is shown to be in the form of a gear wheel. Coil 50 is adjacent the wheel having a plurality of substantially uniform spaced teeth or poles while coil 51 is adjacent the timing wheel 102 having a single gear tooth or pole. Each of the teeth or poles of the wheel adjacent coil 50 generates a pulse which is employed to control the recording of signals in the drum as will be described hereinafter. During each revolution a single pulse is generated in coil 51 which is used to restore numerous circuits to their initial condition so these circuits may start from a given initial condition once during each revolution. Consequently, errors in the circuits will not be additive for more than one revolution of the drum. While special coils 50 and 51 are shown adjacent the gear or tooth wheels for generating timing purposes, it is also within the scope of this invention to provide the timing pulses from pick-up coils such as 50 and 51 located adjacent channels on the magnetic drum which channels will have the synchronizing pulses recorded in them in any suitable manner such as by an oscillator or continuous pulse generator or the like. However, in the exemplary embodiment set forth herein the timing pulses are generated by means of the tooth wheels which are mounted upon the same shaft or at least driven at the same speed as the magnetic drum and usually from the same motor or other driving means. The output of coils 50 and 51 is amplified by the respective amplifiers 60 and 61. Output coil 50 and amplifier 60 are so designed that a high positive output pulse is obtained for each tooth of gear wheel which passes under the pole-pieces of coil 50. The amplifier 60 contains the necessary pulse forming, pulse shaping means and means for otherwise controlling pulse characteristics as required. In an exemplary embodiment of this invention, pulse output from amplifier 60 for each of the teeth of the gear wheel under coil 50 has a duration of approximately one-tenth the time required for a cell of the magnetic surface of the drum as defined above to pass under a pick-up coil. This pulse duration is not critical and satisfactory results may be obtained with pulses of such a duration.

The output from amplifier 61 comprises a pulse of high negative voltage or polarity for each revolution of the drum or the single tooth wheel. This pulse has a duration which is appreciably greater than the duration of the timing pulses obtained from amplifier 60 but still shorter than the time required for a cell to pass under a recording or pick-up head.

The pulses from the amplifiers 60 and 61 are applied to the various gate circuits and other controlling circuits to accurately time the operation of these circuits relative to the angular position of the drum. In addition, the output pulses from these amplifiers 60 and 61 are also applied to the sweep or synchronizing control circuits for the cathode-ray tube 25 so that a beam of electrons will be properly synchronized with the angular portion of the drum and fall upon the proper targets in the cathode-ray tube. Thus, the timing pulses from the amplifier 60 are applied through a delay line 281 to a cathode follower tube 282. The cathode follower tube repeats the pulses and applies them to coupling condenser 253.

The delay line 281 may take any of the suitable forms of delay lines or devices provided so that the pulses from the cathode follower tube 282 are delayed sufficiently so that the normal timing pulses applied to various gate circuits and thus to the recording coils are substantially terminated before the pulses appear on the cathode of the cathode follower tube 282. Thus, the operation of the sweep circuit and the beam of electrons in the cathode-ray tube 25 is actuated after or between the application of timing pulses to the various gates of the recording amplifiers as will be described hereinafter.

Each time the cathode of tube 282 becomes more positive, a pulse of the charging current is transmitted through the coupling condenser 253, rectifier or diode 254 to the storage condenser 256. The time constant of these circuits is such that the charging current is completed before the termination of the positive pulse. As a result the duration of the pulse produces substantially no effect on the quantity of charge delivered to the storage condenser 256. This quantity of charge, of course, raises the potential of the upper terminal of condenser 256 by a small increment.

Thereafter, when the cathode of tube 282 falls to a lower voltage at the termination of the pulse applied from the delay line 281, a discharge current will flow through coupling condenser 253, thus discharging this condenser through a circuit including the diode or rectifier 255. The rectifier 255 is poled so it will pass the discharge current from the right-hand terminal of condenser 253 to ground through the output impedance of the cathode follower tube 257. As a result the right-hand terminal of condenser 253 is discharged to a potential controlled by the cathode of tube 257. Tube 257 is the cathode follower tube which has its grid or input circuit connected to the upper terminal of the storage condenser 256 with the result that the voltage of its cathode is at substantially the same voltage as the upper terminal of condenser 256. Consequently, at the termination of each of the pulses repeated through tube 252, the right-hand terminal of condenser 253 is discharged to substantially the same voltage as the upper terminal of condenser 256. Then upon the application of the next positive pulse, an additional charge is stored in condenser 256, the voltage of which is then again increased by substantially the same increment.

By providing the cathode follower tube 257 and discharging the right-hand terminal of condenser 253 to a voltage substantially equal to the upper terminal of condenser 256, substantially the same quantity of charge is conveyed to condenser 256 in response to each of the timing or synchronizing pulses repeated by tube 282 from the amplifier 60. Consequently, each of the increments of charge and each of the increments of voltage of the upper terminals of condenser 256 are substantially equal.

The upper terminal of condenser 256 is also connected to the control grid of tube 258 as shown in Fig. 2 with the result that the output of anode current of this tube flowing through the resistor 249 is progressively increased by small steps of uniform magnitude. As a result the voltage across resistor 249 changes in corresponding steps of uniform magnitude. The resistor 249 and thus the anode of tubes 258 and 259 are connected to one of the horizontal deflecting plates of the cathode-ray tube 25, it being assumed, of course, that the other deflecting plate is connected to the ground. Consequently, the beam is moved across the tube in a number of small steps of uniform magnitude and between each movement of the beam the beam will rest upon one of the targets at the end of the tube.

Tube 258 is given a negative input or grid bias by the positive battery connected to its cathode which should be more positive than the most positive voltage of condenser 256. When the grid of tube 258 is thus maintained negative with respect to the cathode, its impedance is sufficiently high so that it does not affect the voltage of the upper terminal of condenser 256.

The upper terminal of condenser 256 is also connected to the control grid of the left-hand section of tube 274 which tube is connected as a gate or threshold tube with the right-hand section conducting current and the left-hand section non-conducting. As a result, the right-hand section will have its anode at a relatively low voltage due to current flowing in the anode-cathode circuit of this section of the tube. Likewise, due to the action of the cathode resistor common to both sections of this tube, the cathodes of both sections will be at substantially the same potential as the grid of the right-hand section plus the small bias required in the operation of the right-hand section of tube 274. Consequently, as long as the grid of the left-hand section of this tube remains substantially below the voltage of the grid of the right-hand section, no current flows through the left-hand section of the tube. In addition this grid has a high input impedance so it does not materially affect the voltage of the upper terminal of condenser 256.

However, after a sufficient number of steps or increments of charge have been stored in condenser 256, the upper terminal of this condenser rises to a voltage which approaches the voltage of the grid of the right-hand section of tube 274. Consequently, when this grid voltage approaches the grid voltage of the right-hand section, the left-hand section will start to conduct current with the result that its anode will fall in voltage and apply a negative voltage through the coupling condenser 280 to the control grid of the right-hand section of tube 274. This negative pulse is of sufficient magnitude to drive the voltage of the grid of the right-hand section of tube 274 substantially below the voltage of the grid of the left-hand section and negative with respect to ground and thus causes the current through the right-hand section to be interrupted whereupon the anode of this section rises to a more positive voltage and applies a positive pulse to the control grid of tube 273 and also to the coupling condenser 263.

The positive pulse from the anode of the right-hand section of tube 274 causes the charging current to flow through coupling condenser 263, rectifier or diode 264 to the storage condenser 266 causing the voltage of the upper terminal of this condenser to become more positive by a small increment. This voltage is applied to the control grid of repeating tube 268 which causes the voltage of its anode to fall by a small increment due to the increase of voltage drop across the anode resistor 248. The anode resistor 248 is connected to one of the vertical deflection plates of tube 25 with the result that the beam is moved up one step or one row of the targets or anodes in the tube 25. At the termination of the positive pulse from the anode of tube 274, the condenser 263 is discharged through the diode or rectifier 265 to a voltage such that the lower terminal of condenser 263 is at substantially the same voltage as the upper terminal of condenser 266 due to the operation of cathode follower tube 267 which tube operates substantially the same as described above with reference to tube 257

When the number of targets or electrodes in the end of the cathode-ray tube 25 is sufficiently small, the cathode follower tubes 257 and 267 which cause the charges to be delivered to the storage condenser 256 and 266 to be substantially the same independently of the charge on the storage condensers, may be dispensed with and the lower terminals of rectifiers 255 and 265 connected directly to ground.

In response to the positive voltage applied to the control grid of tube 273, as described above, tube 273 starts to conduct current and discharges the upper terminal of condenser 256 to a voltage which is substantially equal to ground potential due to the low impedance of the rectifiers or diodes 254 and 255 which are conducting in the forward or low impedance direction at this time. The time constant of the coupling condenser 280 and its related circuit is such that the anode current of the right-hand section of tube 274 remains interrupted for a sufficiently long interval of time to discharge condenser 256 and cause an increment of charge to be stored in condenser 266 as described above. Thereafter and before the next timing pulse is received from amplifier 60 the right-hand section of tube 274 starts to pass current through its anode circuit and return the related circuits to their initial condition.

Thereafter, each succeeding positive pulse from tube 252 causes another incremental charge to be stored on condenser 256 and the above-described operation repeated. As a result the electron beam of tube 25 steps across the next row of targets and then returns to its initial position and is moved in a vertical direction to the next row. In this manner, the beam is caused to step across and fall upon each of the targets of a row and move to the next row and so on until it has passed over a target in response to each timing pulse received from amplifier 60.

After the drum has made substantially a complete revolution, a negative pulse is received from the amplifier 61 which negative pulse is delayed by the delay line or device 261 so that it may be properly oriented or timed with respect to the other pulses in the manner described above. This delay line may be of any suitable type or design. After delay, this pulse is applied to the control grid of tube 262 which inverts it and applies a positive pulse to both sections of tube 275. Both sections of this tube are biased to or beyond plate current cut-off so that these sections do not normally affect the voltage on the upper terminals of condensers 256 and 266. However, upon the application of a positive pulse to the grids, both sections conduct current and discharge the storage condensers 266 and 256 to substantially ground voltage, thus restoring the potential conditions of the upper terminals of condensers 256 and 266 to their initial voltage whereupon the above-described cycle of operations is repeated and the beam within tube 25 caused to again step on each of the targets or electrodes in succession.

In order to insure that the beam within tube 25 will be properly centered on each of the targets between the steps and to insure that the beam will start from the first target in each row and start on the first row of the vertical direction, the centering tubes and controlling circuits and apparatus are provided. Tube 259 is connected with its anode to the anode resistor 249 and thus in parallel with tube 258. The control grid of tube 259 is connected to potentiometer 271 which is employed to control the initial or bias current flowing through the anode resistor 249 to properly position the beam in a horizontal direction. Likewise tube 269 is connected in parallel with tube 268, and has its control grid connected to potentiometer 272. As a result the vertical positioning of the beam is accurately controlled by means of potentiometer 272 which controls the current flowing through tube 269 and thus through anode resistor 248. In this manner the beam may be properly centered in a vertical direction.

Thus, the electron beam from tube 25 is caused to step to each one of the targets or electrodes in tube 25 which are connected to calling lines once for each revolution of the drum 104. The current or calling condition of the line at these times is employed to control the recording of signals and magnetic conditions within the drum.

The operation of the recording of signals within the drum may be better understood and the initial operation of the system improved, if it is assumed that the drum is initially magnetized as will be described.

As shown in Fig. 1 the drum is divided into two sections, the section on the left-hand being a delay section, while the section on the right is the main storage section of the drum. Of course, when desired two drums may be provided and driven by the same motor or at least maintained in accurate synchronism with each other by any suitable means. When desired, these sections may be on the same drum as shown in Fig. 1.

In the main or storage section of the drum, it is assumed that the drum is initially magnetized by applying a substantially continuous current through each of the recording coils and substantially saturating the magnetic material in the drum as its passes under the pole-pieces of of each of these coils. The direction of current applied to these coils is assumed to be in the direction producing the so-called O signal when it is desired to record such a signal of the drum. In order to record the opposite or X signal in the drum the polarity of the current applied to the recording coil will be reversed and the magnetic field between the pole-pieces and in the recording coil will likewise be reversed and reverse the magnetization of the surface of the drum in the cell under the recording coil at that time.

In the case of the delay section of the drum, it is desirable to provide a third type of magnetization which produces no voltage in the pick-up or reading coil. Such a magnetic condition is readily obtained by orienting an additional coil located adjacent each of the channels and rotating the pole-pieces with respect to the channel so that they are substantially 90 degrees displaced from the pole-pieces of the recording coil and corresponding pick-up coil and applying a substantially unvarying current. Thus, when an O signal is recorded in the magnetic material of a cell by orienting the so-called magnetic vectors in one direction, said direction causes a voltage of one polarity to be obtained from pick-up coils when that portion or cell of the drum passes thereunder. The recording of an X signal will apply the reverse magnetization to the magnetic material and thus effect the reverse orientation of the magnetic vectors so that voltage of opposite polarity is obtained when such a cell passes under the pick-up coil pole-pieces. The erasing or third magnetic condition will cause the magnetic vectors to be rotated at an angle of 90 degrees from the first direction and thus cause no voltage to be induced in the pick-up or output coils when a cell having its vector so oriented passes under the pole-pieces of the pick-up coil.

When only two magnetic conditions are required as in most of the channels of the main recording drum, the first or zero signal condition recorded in the drum will not produce a voltage in the pick-up coil, whereas, the opposite magnetic condition represents an X signal and causes a voltage of predetermined polarity and wave shape to be induced in the corresponding pick-up coils.

It should be noted that the pick-up coils, recording coils, magnetic drum, the cathode-ray tube, as well as gate circuits, and other common control circuits, are common to all the lines assigned to slots or cells upon the magnetic drum.

As the cathode-ray beam electrons fall on a target in the beam tube 25 assigned to a given line, it will produce output voltages as will be described hereinafter which will be recorded in the magnetic drum. The beam of electrons falls upon a given target at the same angular position of the drum during each rotation of the drum. The cells under the recording heads at this time, and thus the slot comprising these cells, are assigned to the line connected to the target upon which the beam falls at this time. These elemental areas or cells forming such slots are employed only by the lines to which they are assigned and may be employed continuously to record the electrical conditions and history of the electrical conditions of said line as will be described hereinafter.

Two calling lines 14 and 15 are shown in Fig. 1 connected to the electrodes 32 and 33 of tube 25. Each of these lines is provided with a calling switch 10 and 11, respectively, and other calling devices such as dials 20 and 21, respectively. A source of electrical or power potential is applied through these lines through resistors 16 and 18 for line 14, and 17 and 19 for line 15. In addition suitable terminating equipment such as 40 and 41 is provided for each of these lines which terminating equipment may be telephone apparatus or other control equipment, as may be desired so long as no direct-current path exists between the line conductors.

The speed of rotation of the drum 104 and thus the speed of the electron beam of tube 25 must be sufficiently rapid so that the beam will fall upon the electrodes connected to each line at least once during each signaling condition which it is desired to recognize and record in the drum. If the signals to be received are in the form of dial pulses, then the speed of rotation of the magnetic drum and also the speed of the cathode-ray beam must be such that the drum will make one complete revolution and the electron beam sweep over all of the targets within tube 25 in a minimum open or closed interval of any dial of any calling line. When desired, the scanning rate and thus the speed of operation of the drum and electron beam may be increased above the above minimum speed and the system will operate in the same manner as described herein.

As long as the calling lines such as lines 14 and 15 remain idle substantially no current flows through the resistors 16, 18, connected to line 14 and substantially no current flows through resistors 17 and 18 connected to line 15. The same conditions apply to the other lines similarly connected to tube 25 not shown in the drawing.

Since no current flows through resistors corresponding to resistors 16 and 17 the corresponding targets or anodes of tube 25 such as the respective targets 32 and 33 are maintained at substantially ground potential with the result that these electrodes attract electrons from the beam of this tube when it is directed towards these corresponding electrodes. As a result a large number of the beam electrons fall upon these corresponding electrodes when they are at substantially ground potential as described above, with the result that a large number of secondary electrons are emitted from the surface of these electrodes of the targets which electrons are collected by the collector electrode 37. In other words, relatively large electron current flows through this collector electrode producing a relatively large voltage drop across output impedance or resistor 39 with the result that the voltage of the collector element 37 is maintained at a relatively low or negative value in response to the ground potential maintained on the respective target elements 32, 33, etc.

However, when it is desired to originate a call over one or more of the lines corresponding switches 10, 11, etc., will be closed. If switch 11 is closed a circuit is completed from negative battery through resistor 18, line conductor 14, contacts 10 and 20, line conductor 14 and resistor 16 producing a flow of current through resistor 16 and thus causing a voltage drop to appear across this resistor.

The call-initiating contacts 10 may be of any suitable type such as key contacts, switchhook contacts or cradle contacts of the telephone subscriber's station or any suitable type of electrical switch. Likewise the contacts 20 may comprise any suitable form of signaling contacts such as a telegraph key, a telephone dial or contacts of other calling devices employed in annunciators, dispatching systems, etc.

The current flowing through resistor 16 in response to the initiation of a call over line 14 produces a voltage drop across resistor 16 such that conductor 30 connecting the upper terminal of resistor 16 to target 32 of tube 25 becomes a negative with respect to ground. Consequently, the target element 32 of tube 25 tends to repel more electrons from the beam even when directed towards this target element and as a result fewer electrons fall upon the target at this time. Consequently, fewer secondary electrons are emitted since the ratio between primary and secondary electrons under the operating conditions of tube 25 remain substantially constant. As a result less electrons are collected by the collector 37 so that the smaller potential drop appears across resistor 39. In other words the voltage of the collector electrode 37 becomes more positive during the time the electron beam is directed toward the target element 32.

Consequently, the collector element 37 is at a relatively more negative voltage when the electron beam of tube 25 impinges upon a collector element connected to an idle line and is relatively more positive when the beam impinges upon a collector element connected to the calling line over which electric current flows. These voltage changes are repeated by the cathode follower tube 46 and over lead 45 to the lower left-hand input circuits of the gates G1 and G2 designated 201 and 211 in Fig. 1.

These gate circuits are employed to control the writing or recording of information upon a magnetic drum mounted on the shaft 100. The magnetic drum comprises any suitable type of cylindrical surface rotatably supported on the shaft which permits revolution of the drum about its axis. The drum in turn is rotated about its axis by means of an electric motor or other suitable driving force, not shown in the drawing. It is assumed, however, that the drum continuously rotates during the time the system is in operation. As pointed out hereinbefore the surface of this drum comprises a layer of magnetic material which once magnetized maintains its magnetization indefinitely. The direction of the magnetization, however, may be changed by means of a recording coil such as coils 111, 121, etc. located adjacent the surface of the drum. These writing or recording coils are provided with two windings, one for magnetizing the magnetic elements of the surface of the drum in one direction, and the other for magnetizing the elements of the surface of the drum in the opposite direction.

For convenience in referring to these directions of magnetization the left-hand coil of head 111, for example, as shown in the drawing is assumed to produce a direction of magnetization in the drum called an X signal while the right-hand coil is assumed to produce a direction of magnetization on the surface of the drum called an O signal. It is to be understood, however, that the coils that produce the X signals and the coils that produce the O signal may be wound upon both of the pole-pieces of the recording coil 111. As shown in the drawing the coils of the recording head 111 are connected to the output circuit of a recording or writing amplifier 110. As shown, the amplifier 110 is provided with two input leads, one designated X and the other O.

Both of these leads are normally maintained at a relatively low voltage near ground potential by the gate circuit 201. The input leads 2 and 3 are coupled through condensers to the in grids of the respective tubes 311 and 312. In the exemplary embodiment these input grids of the amplifier tubes 311 and 312 are normally maintained or biased at a negative voltage with respect to ground and as a result no output current flows in the output circuit of amplifier 110 so that under these conditions the magnetic conditions of the surface elements of the drum passing under the pole tips of coil 111 are not changed.

Gate circuits such as G1 comprise a plurality of rectifiers or diodes which may be either of the germanium crystal type, or other suitable forms of crystals or combinations of crystals or high vacuum diodes. The gate circuits have an input circuit shown at the bottom of the rectangle which is connected to the output of the synchronizing amplifier 60. The gate circuit has input circuits shown at the left-hand side of the rectangle or box 201 which in turn are connected to the rectifiers 206 and 208. This gate circuit also has an input lead shown at the right-hand side of the rectangle in turn connected to the rectifier element 207.

Each of the input leads to the gate circuits have either one or the other of two different voltage or current conditions applied to it. In the exemplary system described herein in detail the gate circuits are arranged to have their input circuits or terminals connected to relative low impedance circuits which will apply either a high positive voltage of say about 75 volts or more to the input terminal or a low positive voltage of say about 25 volts or less thereto.

So long as a low positive voltage is applied to any one or more of the inputs current flows from battery 200, and from any of the other inputs having a high positive voltage applied to it, through the diode connected to the relative low positive voltage with the result that the common point which comprises an output from the gate circuit is maintained at or near the voltage of the relative low voltage applied to that input lead or leads.

When the voltage applied to all of the input terminals on the left-hand side is a high positive voltage, the gate circuit is arranged so that it will apply a high positive voltage to the X input lead to amplifier 110 in response to a high positive synchronizing pulse supplied from the synchronizing amplifier 60 to the common point between the diodes 204 and 205, with the result this change in voltage causes an X signal to be recorded in the corresponding cell or unit area in the surface of the drum passing under the recording coil 111, at this time. Likewise when a high positive voltage is applied to the input lead connected to the diode 207 a high positive voltage is repeated to the O input lead to amplifier 110 when a high positive synchronizing pulse is applied from the synchronizing amplifier 60 to the common point between the diodes 204 and 205 with the result that an O is recorded in the magnetic element of the drum passing under the recording head 111 at this time.

The gate circuits such as G1 shown within the rectangle 201 may be arranged in a plurality of different manners. These gate circuits may be arranged so that a high positive voltage applied to any one of the input leads will cause a high positive voltage to be repeated to the corresponding output lead in response to the application of a high positive synchronizing pulse from the synchronizing lead. Such gate circuits are sometimes called "Or" gate circuits, that is, circuits in which outputs appear in response to a high positive voltage applied to any one or more of the input leads. Alternatively, the gate circuits may be arranged such that a high positive voltage has to be applied to all of the input leads or all of a group of the input leads before a high positive voltage is repeated to the corresponding output lead. Such circuits are frequently called "And" circuits. Such circuits are obtained by applying suitable potentials to the diode elements and properly orienting the diode element. These circuits may also be arranged so that combinations of the two types of circuits may be employed when desired. Furthermore, the voltages applied to these circuits may be such that input voltages so applied to the input leads prevent a high positive output pulse instead of permitting one, as described above.

For example, with respect to the gate circuit G1, it is necessary for a high positive voltage to be applied to the right-hand terminal of the diode 207 to cause an O to be recorded by the recording coil 111 in response to a high positive synchronizing pulse from the synchronizing amplifier 60.

With respect to the inputs required to cause the recording coil to record X in the corresponding cell of the magnetic drum, the voltage of both of the input leads on the left-hand side of the gate G1 must be a high positive voltage. However, in the absence of a recorded X signal passing under the pick-up coil 115 at this time the output from the X lead from amplifier 116 is a low positive voltage and the output from the O lead of amplifier 116 is a high positive voltage as will be described hereinafter, with the result that a high positive voltage is applied to the diode 206. Consequently, when the voltage of the collector electrode 37 becomes positive, a high positive potential is applied to the left-hand terminal of the diode 208 through the cathode follower tube 46 and as a result when the synchronizing pulse from the amplifier 60 is applied to the gate G1, the voltage of the X input lead to amplifier 110 becomes a high positive voltage and causes an X to be recorded in the corresponding cell under the recording head 111 at this time. No high positive voltage is applied to the O input lead to amplifier 110 at this time. Then the electron beam will move on to the next target in response to the sweep circuit and synchronizing circuit described hereinbefore so that in case the next line is also busy or has current flowing over it, an X will be written or recorded in the next cell. Conversely, if the next line has no current flowing in it at this time, an X will not be written or recorded in the succeeding cell because collector electrode 37 will not be sufficiently positive and thus will not apply a high positive voltage to the left-hand terminal of diode 208.

After the above-described X is written in the cell corresponding to line 14, in the manner described above, this cell will pass around the drum and pass under the pick-up or reading head 112 and cause an output voltage to be developed in the winding of this head or coil. The output coils from the pick-up head 112 are connected to transfer amplifier 113 which causes the corresponding X to be recorded by the recording head 114 in the cell passing under this recording coil at this time. The X recorded by the recording head 111 then continues around the drum and passes under the erasing head 118. The erasing head comprises a permanent magnet or a continuously energized electromagnet oriented in such direction that the magnetization of the drum after passing under this head produces no output voltage in any of the pick-up coils under which this portion of the drum will pass. During the time the X recorded by the recording head 111 is rotating from the pick-up head 112 to the erasing head 118 and then on to the recording head 111 again the X recorded by the recording head 114 is also rotated around the drum so that at approximately the same time that the electron beam of tube 25 again falls on target 32 connected to line 14 in the manner described above, the X recorded in the cell assigned to line 14 on the drum in the channel associated with head 115 will pass under head 115. As a result the voltage induced in the pick-up head 115 and amplified by amplifier 116 causes a high positive voltage to be applied to the output X lead of amplifier 116 and causes a low positive voltage to be applied over the output O lead from amplifier 116 to the left-hand terminal of diode 206 at this time, so that when this next high positive pulse from the scanning tube due to the scanning of line 14 and the next corresponding high positive synchronizing pulse from the amplifier 60 are applied to diodes 208, 204 and 205, the voltage of the X lead is prevented from becoming positive. Consequently, no further signals will be recorded by the head 111 at this time so no further voltages will be induced in the pick-up head 112 by the cell in the channel under head 111 assigned to line 14. However, the X recorded in the cell in the channel under heads 114 and 115 assigned to line 14 will remain until removed or changed in the manner described hereinafter.

The voltage from the electrode 37 as repeated by the cathode follower tube 46 is also applied to the left-hand input terminal of the gate G2 shown within rectangle 211 in Fig. 1. This gate is in turn connected through an amplifier 120 to a recording head 121 which amplifier and recording head are arranged to write or record only X's upon the corresponding channel of the drum. Thus, each time the synchronizing pulse from the amplifier 60 is applied to the diode 214, a high positive pulse appears on the X lead from gate 211 when positive voltage is also applied to the diode 216 through the cathode follower tube 46 from the collector electrode 37 of tube 25. As pointed out above, such a high positive voltage is applied to the collector electrode 37 and thus to the diode 216 each time the beam of the tube 25 falls upon the target connected to a line over which line current is flowing, with the result that an X is written in each of the cells in the channel under the recording head 121 assigned to the respective lines having current flowing over them. When these cells pass under the pick-up head 122, they induce voltage therein which are repeated by the repeating or transfer circuit 123 to the recording head 124 which records corresponding X's in the corresponding cells in this channel assigned to the respective lines. Returning now to the X recorded in the cell assigned to line 14, of the channel under the head 122, as the drum rotates this cell passes from under the head 122 to the erasing head 128. At this time this X is erased and the cell then continues to travel around the drum and again passes under the recording head 121 where an X is again written in this cell if current is still flowing in the line at this time.

As pointed out above, the beam of tube 25 will again fall on a target 32 at this time.

Consider now the X written or recorded by the recording head 124. As the drum rotates, this X will pass under the reading or pick-up head 125 and cause an output in the output amplifier 126 indicating that an X was recorded in the corresponding cell in a channel under the recording head 124. As this cell or area continues to rotate, it will pass under the erasing head 129 which changes the magnetization of this cell so that it is no longer capable of inducing any voltage in the pick-up head 125. However, as pointed out above, if current continues to flow in the line so that an X is again written or recorded by head 121, the corresponding voltage will again be induced in the pick-up head 122 and transferred to the recording head 124 and recorded in the same cell assigned to line 14. The above operations then continue for each of the lines so long as line current flows over the line. At this time it should be noted that the channel under the heads 111 and 112 do not have either an X or an O recorded in them; the previous recordings having been erased. The channel under the heads 121 and 122 has an X written or recorded in each of the cells each time these cells pass under recording head 121 so long as the corresponding line has current flowing in it when the electron beam of tube 25 falls upon the target electrode connected to the respective line. The X's written in this channel are continually transferred to the recording head 124 and then later erased by the erasing head 118. X's recorded by the recording head 124 in turn induce output voltages in the pick-up head 125 and then are erased by the erasing head 129 associated with the channel of heads 124 and 125.

The above-described operation of the various heads, coils, circuits, amplifiers, gates and scanning tube 25 has been described with reference to line 14. The circuits respond in a similar manner to current flowing over line 15 and to all the other lines connected to the respective targets of tube 25. As pointed out above, the voltage condition across the corresponding resistance of the respective lines causes X signals to be written in the cells of the respective channels described above assigned to the respective calling lines. The condition of each of the calling lines is thus recorded in a predetermined cell or unit area on the surface of the magnetic drum assigned to the respective lines.

So long as the line 14 remains closed the potential of the collector electrode 37 will be at a high positive value each time the beam falls upon a target 32. However, the X signal recorded in a channel under coils 114 and 115 will prevent any recording by the recording coil 111 at this time. However, X signals will be recorded by recording coil 121 of the delay portion of the drum at each of these times when X signals are transferred to the storage portion of the drum and recorded therein by coil 124. At each of these times except the first one as described above, high positive voltages exist at the X output leads and low voltages exist at the O output leads from amplifiers 116 and 126 due to the X's recorded in the cells or elemental areas of the drum assigned to line 14, for example, as these cells pass under the pick-up coils 115 and 125.

In response to an opening of the contacts of the dial 20 or contacts 10 the potential drop across resistor 16 would fall to zero with the result that the voltage of the target element 32 becomes more positive and thus attracts more electrons from the beam the next time the beam is directed towards this target element. Consequently, more secondary electrons will be emitted by the target 32 thus causing greater current to flow in the circuit of the collector electrode 37 with the result that the output voltage will be at a lower or more negative value at this time. As a result an X will not be recorded by either of the recording coils 121 or 111 and thus an X will not be recorded by the recording coil 124. As a result the next time the cell under coil 124 assigned to line 14 passes under the pick-up coil 125 positive voltage appears on the output lead O instead of on the X lead of amplifier 126. At the same time the X initially recorded by the recording coil 114 will pass under the pick-up coil 115 and cause a positive voltage pulse to be transmitted over the X lead from amplifier 116. The outputs of amplifiers 116, 126, and 136 are connected to a translating or combining circuit 251. The combining circuit 251 comprises a plurality of two-element diodes which may be of a high vacuum type but as indicated in the drawing, these elements may also comprise crystal rectifiers or any suitable type including germanium, and similar types of rectifying contacts, semiconductors and the like.

As indicated in the left of the rectangle 251 an XO lead extends from this rectangle which lead has a rectifier or diode connected between it and the X output lead from amplifier 116. The XO lead also has a rectifier connected between it and the O lead from amplifier 126. These rectifiers are poled in such a direction that the voltage on the XO lead is at a low value so long as the voltage on the X lead from amplifier 116 or the O lead from amplifier 126 is at a low value. If either of these outputs are negative the corresponding rectifier will conduct appreciable current from the battery 252 and thus maintain a voltage of the XO lead at a relatively low value near the lowest value voltage applied to either X lead from amplifier 116 or the O lead from amplifier 126 whichever of these two leads is the lowest in voltage.

However, when an X passes under the pick-up coil 115 and an O passes under the pick-up coil 125 substantially simultaneously therewith, positive voltage appears on the X lead output from amplifier 116 and the O lead output from amplifier 126.

Due to the previous magnetization of the other portions of the drum the output from the amplifier 136 will be a high positive voltage on the O lead and a low positive voltage on the X lead at this time and until an X is recorded in the corresponding cells passing under these coils assigned to the line 14.

As a result a high positive output voltage appears on lead XOO at this time. The XOO lead has a rectifier or diode connected between it and the X output lead from amplifier 116 and a diode connected between it and the O output lead from amplifier 126 and a diode connected between it and the O output lead from amplifier 136. These rectifiers are poled in such a direction that the voltage on lead XOO is low so long as the voltage of any of the above-identified leads from the amplifiers 114, 126, 136 is a low positive voltage. However, as described above the first time after line 14 has been opened and the slot assigned to this line passes under the pick-up coils 115, 125 and 135, a high positive voltage appears on the output leads from amplifiers 116, 126 and 136 connected to lead XOO through the diodes as described above. Consequently, the voltage on lead XOO becomes high at this time. At the same time another cell or elemental area of the surface of the drum or cylinder assigned to line 14 passages under the recording coil 131. The high positive voltage on lead XOO which is connected to the diode 222 in the gate circuit 221 causes a high positive voltage to be repeated on the X output lead of gate circuit 221 in response to a high positive synchronizing voltage pulse from amplifier 60 and diode of gate circuit 221. This X output lead extends to the recording amplifier 130 and the high positive voltage on this X lead in turn causes the recording coil 131 to record an X in the elemental area in this recording coil assigned to line 14. After a delay interval the X is transferred to the recording coil 134 and recorded in an elemental area under this coil at this time which elemental area is likewise assigned to line 14. When the X recorded by the recording coil 134 passes under the pick-up coil 135, it will cause the output on the O lead from amplifier 136 to be low and the voltage applied to the output X lead from amplifier 136 to become high. As a result a high positive voltage does not again appear on the XOO lead because the output voltage of the O lead from amplifier 136 is now low and thus controls the voltage of the XOO lead.

After the X recorded by the recording coil 131 passes under the pick-up coil 132 and is transferred to the recording coil 134 as described above, it is erased by the erasing magnet or coil 138. Thus when the X passes under the pick-up coil 135 as described above, no high positive voltage appears on the X lead to the recording amplifier 130 an X is not recorded in the elemental area assigned to line 14 at this time. The X remains recorded in the elemental area assigned to line 14 associated with the pick-up coil 135 until changed as will be described hereinafter.

So long as line 14 remains open no further signals are recorded by any of the recording coils 111, 121, 114 or 124 with the result that a high positive voltage appears on lead XO each time the X originally recorded by the coil 114 passes under the pick-up coil 115 in the manner described above. These high positive voltages are transmitted to a counting or timing circuit and employed to indicate a disconnect or termination of the call in a manner to be described hereinafter.

However, assume that before any disconnect or termination connection appears due to the operation of the counting or timing circuit 270, line 14 is reclosed. As a result the voltage of the collector electrode 37 again becomes more positive when the cathode-ray beam next impinges upon the target 32. As a result an X signal will be recorded by the recording coil 121 in the delay section of the magnetic drum. At a short interval of time later an X signal will be recorded by the recording coil 124 in the cell or elemental area thereunder assigned to line 14 in a manner described hereinbefore. When this portion of the drum passes under pick-up coil 125 the X signal originally recorded by the recording coil 114 also passes under the pick-up coil 115 with the result that high positive voltage appears on the X output leads from amplifiers 116 and 126 and a low voltage is obtained from the O output leads from these amplifiers.

The XXX lead from the translating or combining circuit 251 has a diode connected between it and the X output leads from each of the amplifiers 116, 126 and 136 with the result that a high positive voltage is obtained from this lead the first time the X originally recorded by the recording coil 114 and the X recorded by the coil 124 and the X recorded by recording coil 134 passes under the pick-up leads 115, 125 and 135 after the line 14 has reclosed.

Lead XXX extends to the diode 223 of the gate of translating circuit 221 and also to the diode 232 of the gate circuit 231. The high positive pulse applied to the diode 223 at this time causes an O signal to be recorded in the cell or elemental area of the drum assigned to line 14 under the coil 131 at this time. Likewise a high positive voltage on lead XXX at this time applied to the diode 232 causes an X signal to be recorded by the recording coil 141 which X is later transferred to the recording coil 144 and recorded in another cell or elemental area of the drum under coil 144 which is likewise assigned to line 14.

The O signal recorded in the cell under coil 131 later passes under the pick-up coil 132 and is transferred to the recording coil 134. At the time this O signal is applied to the recording coil 134 the X signal previously recorded in the cell which is now under this coil and assigned to line 14, will be written over or changed to an O signal and thus in effect canceled and an O signal substituted therefor. Thus after the elemental areas assigned to line 14 pass under the respective coils 114, 124, 134 and 144 they will have X, X, O, and X signals, respectively, stored or recorded in them.

Thus in response to the closure of a calling line, such as 14, an X signal is recorded by coils 111 and 114 in the cells or elemental areas assigned to said line 14. These areas are in the channel designated G1. In response to the subsequent opening of the calling line 14 an X signal is recorded by coils 131 and 134 in the areas assigned to line 14. These areas are in the channel designated H herein. In response to the subsequent reclosing of the calling line 14 an X signal is recorded in the elemental areas or cells under coils 141 and 144 assigned to line 14. These areas are in the channel on the magnetic drum designated channel J herein.

Any of the above signals or sequences of signals, i. e., the closure of a calling line, the closure of the calling line followed by the opening thereof, or the closure of the calling line, followed by an opening of that line which opening is followed by a reclosure of the line may comprise a calling signal and the exemplary embodiment described in detail herein may be arranged to recognize and respond to any or all of the above calling signals or to more complicated patterns of signals as described hereinafter. As shown in Fig. 1 the input lead 148 to the register and display apparatus is connected to the X output lead from amplifier 146 of channel J. Consequently, this equipment responds to the last type of call signals enumerated above. However, by connecting a lead similar to 148 to the X output lead from the amplifiers of other channels, such as G1 or H, instead of from channel J the system will respond to the other call signals described above. When desired additional register and display equipment may be provided and connected to different ones of the channels for responding to different types of call signals.

In order to display the call it is necessary that the display or registering mechanism be idle and properly reset to a zero condition. This registering equipment as shown in Fig. 1 comprises a plurality of counter tubes 1011, 1012, etc., reset multivibrator tube 1050, a group of registering tubes 1040, 1041, etc., indicating tubes 1070, 1071, etc. and reset tubes 1060, 1061, etc. A control and combining circuit comprising the diodes 153, 154, 155 and 156 together with a repeating cathode-follower tube 911 is provided for controlling the registering equipment. The restoring multivibrator tube 1050 is arranged so that the conduction within the tubes automatically returns to the normal conditions after a restoring or reset operation in the manner described hereinafter. The circuit is further arranged so that with key 1051 unoperated, as shown in the drawing, the left-hand section will be conducting and the right-hand section non-conducting due to the connection of the grid of the left-hand section to a more positive bias voltage than that applied to the grid of the right-hand section. Under these circumstances the voltage of the anode of the left-hand section is at a relatively low value so that the right-hand sections of gates 731, 732, etc. are blocked at this time. The voltage of the anode of the right-hand section of tube 1050 is at its most positive value when the right-hand section is conducting substantially no current. As a result, a positive voltage is applied to the upper terminal of diode 154, which voltage is in such a direction that it produces substantially no current flow through the diode because it is in a reverse direction to the mode of easy conduction of the diode.

The counter tubes 1011 and 1012 comprise two representative stages of a multistage binary counter employed to designate the line over which the calling signal or signals originate. In the binary number system each place or denominational order of a number has either one of two different digits, i. e., at 1 or a 0. The tubes 1011, 1012, etc., represent each stage or denominational order and conduction of current by one section of such a tube represents a 0 for that stage or denominational order and the other section conducting represents a 1 for that denominational order. These counter stages are arranged to be reset once per revolution of the drum 104 as will be described hereinafter. Thereafter they count each of the synchronizing pulses which define the unit areas individual to the respective lines. In the exemplary embodiment of the present invention a synchronizing pulse is generated for and defines each of the elemental areas under the pick-up coils assigned to the individual calling lines and these elemental areas assigned a line are under the various pick-up coils as described above when the beam of tube 25 impinges upon the corresponding target or electrode element assigned that line, and inasmuch as this beam is synchronized by the synchronizing pulses to fall on such a target for each synchronizing pulse and inasmuch as the beam follows the same pattern for each revolution of the drum, the beam will in effect sample or test the voltage condition of a given line after a given number of synchronizing pulses have been received from the reference point determined by the single resetting pulse. Consequently, the condition of the counter tubes 1011, 1012, etc., accurately identifies the line having elemental areas under the various pick-up coils at each instant of time.

As shown in the drawing the counter tubes 1011 and 1012 have been arranged so that they are reset to their zero or initial condition once per revolution by a negative pulse applied to them as will be described hereinafter. When these tubes are in their initial or zero condition, the right-hand triode is conducting current between its anode and cathode but no current flows in the anode path of the left-hand section of these tubes.

The synchronizing or timing pulses after passing through the delay line 251 and repeating tube 250 are applied to both sections of tube 1011 through the coupling condenser 1015 and the two diode rectifiers as shown in the drawing. The timing pulses as received from amplifier 60 through the delay line 251 are of a positive polarity. These delayed pulses are repeated by tube 250 as negative pulses and applied to the two diodes. The diodes are poled in such a direction as to offer a low resistance or impedance to negative pulses. Under the assumed conditions with the right-hand section of tube 1011 conducting current, its anode will be at a lower voltage than the anode of the left-hand section. Consequently, the diode connected to this right-hand section will offer appreciably more impedance to the pulse than will the diode connected to the left-hand section. Furthermore, the application of a negative pulse through this right-hand diode to the anode of the right-hand section of tube 1011 and then through the coupling network to the control grid of the left-hand section produces no appreciable effect upon either section of this tube. However, the application of the negative pulse to the left-hand anode of tube 1011 and then through the coupling condenser to the control grid of the right-hand section of this tube tends to reduce the current flowing in the right-hand section. As a result the voltage of the anode of the right-hand section tends to rise or become more positive and apply a more positive voltage to the control grid of the left-hand section of tube 1011 which tube then starts to conduct current and as a result its anode voltage falls tending to make the grid of the right-hand section still more negative. Consequently, the curernt previously flowing through the right-hand section of tube 1011 is interrupted and the current flow through the left-hand section initiated.

Under these circumstances tube 1011 indicates a count of one and remains in the above-described conducting conditions wherein current flows through the left-hand section but not through the right-hand section until the next timing pulse is applied to both sections of this tube.

The second delayed negative timing pulse is applied to both anodes of tube 1011 in the same manner as described above. At this time, however, current flowing through the left-hand section is interrupted due to a negative pulse transmitted from the anode of the right-hand section of tube 1011 and the coupling network to the control grid of the left-hand section. As a result of the consequent decrease in current flowing through the left-hand section, positive voltage is applied to the control grid of the right-hand section which causes current to start the flow through this section.

Thus, upon the application of each of the delayed negative timing pulses the conducting conditions in tube 1011 are reversed.

The initiation of a discharge through the right-hand section of tube 1011 causes the voltage of the anode of this section to fall from substantially the full anode battery supply voltage to a much lower voltage which in turn applies a negative pulse through the coupling condenser and the rectifiers or diodes connected to the two anodes of tube 1012. Under the assumed conditions prior to the application of this negative pulse, the right-hand section of tube 1012 is conducting current while the left-hand section is not. The application of the negative pulse to the two diodes does not at once effect or initiate the flow of current through the left-hand section. However, the application of the negative pulse through the diode connected to the anode of the left-hand section and then through the coupling arrangement of the control grid of the right-hand section reduces or interrupts the current flowing to the right-hand section of this tube thus causing the anode of this section to rise in voltage and apply a positive voltage to the grid of the left-hand section which then starts to conduct current and applies a still more negative voltage to the grid of the right-hand section. In this manner the application of the negative pulse through the coupling condenser and coupling diodes causes the current flowing through the right-hand section to be interrupted and a flow of current from the left-hand section initiated.

Had the left-hand section been conducting current instead of the right-hand, then the application of the negative pulse would be transmitted through the opposite diode and cause the interruption of the current flowing through the left-hand section and an initiation of current flowing through the right-hand section. In other words, upon the application of each negative pulse from the anode of the right-hand section of tube 1011, the discharge current within the tube 1012 is transferred from the previously conducting section to the other section. In a similar manner, each time the anode of the right-hand section becomes more negative due to the initiation of a flow of current to this section of tube 1012, a negative pulse is relayed to the next counter stage and so on.

With the right-hand section of tube 1011 conducting and the left-hand section of tube 1012 conducting, these two tubes indicate a count of 2, since two synchronizing pulses have been applied to the cathodes of tube 1011 as described above.

It should be noted that the counter tubes are advanced by delayed timing pulses. In other words, these counter tubes are not advanced until the undelayed timing pulses have controlled the gate circuits 731, 732, etc., in a manner described hereinafter. Consequently, the timing pulses control the gate circuits and accurately indicate the setting of the counter tubes in a manner described hereinafter before the counter tubes are advanced by the respective delayed timing pulses.

In a similar manner additional synchronizing pulses are counted by tubes 1011, 1012, and similar tubes not shown but provided when necessary. Thus the setting of the conducting conditions of the counter tubes 1011, 1012, etc., at all times accurately represents the identity of the respective lines.

Tubes 1040 and 1041 are gas-filled tubes having a gas pressure of a fraction of an atmosphere and in which the control grid loses control of the current flowing in the anode-cathode circuits once this current starts to flow. These tubes are initially set or conditioned with no current flowing in their anode-cathode circuits and are restored to this condition after each call has been recorded and noted as will be described hereinafter. With each of the tubes 1040, 1041, etc., non-conducting their anodes are at a relatively high positive voltage. However, the diodes 155, 156, etc., are connected to the respective anodes of tubes 1040 and 1041 in the direction to oppose the flow of current through these diodes when these tubes are non-conducting. However, at this time the common terminal of the combining circuit which is connected to the grid of tube 911 is maintained at a relatively low voltage by the output of amplifier 146 until an X signal recorded in channel J is picked up by the corresponding pick-up coil 145.

Upon the sampling of line 14 during the next revolution of the drum 104 after the X signal is recorded in channel J of the delay section the output of the X lead of amplifier 146 will have a high positive voltage applied to its X lead due to the X signal recorded in this channel of the magnetic drum.

Under the assumed conditions the high positive voltage on the X lead 148 from amplifier 146 is the last high positive voltage to be applied to the diodes 153, 154, 155 and 156 with the result that the voltage of the common conductor of this combining circuit changes to a high positive value and tube 911 repeats a high positive voltage in its output or cathode circuit to diodes of the gate circuits 731, 732, etc. If the corresponding counter tube indicates a 1, the right-hand sections will be non-conducting and thus have their anodes at a relatively high voltage. If on the other hand these counter tubes indicate a count of zero the right-hand section will be conducting and its anode at a correspondingly low voltage with the result that the left-hand sections of gates 731 and 732 are substantially blocked or ineffective to transmit a positive voltage to their common or output terminals.

Thus, during the time the X signal recorded in channel J passes under the pick-up coil 145 and causes a high positive voltage to be applied to the output lead 148 from amplifier 146, positive voltage will be applied to all of the input terminals on the left-hand side of the gate circuits 731, 732, etc., when the synchronizing pulse occurring at this time is received from the pick-up coil 50 and amplifier 60. As a result, the tubes 1040, 1041, etc., which are individual to the counter tubes 1011, 1012, etc., which indicate a count or digit value of 1 have a positive voltage applied to their control grids. The tubes 1040 and 1041 individual to counter tubes 1011, 1012, etc., which are in their original or initial condition, that is, indicating a digit value of zero, do not have a positive voltage applied to their control grids. Consequently, discharges are initiated through the register tubes 1040, 1041, etc., at this time if a corresponding counter tube is in its operated condition and not initiated if the corresponding counter tube is in its initial or zero condition. Consequently, the register tubes 1040, 1041, etc., have discharges initiated through them in accordance with the count of the binary counter tubes 1011, 1012, etc. In addition, each high positive pulse from amplifier 60 causes the electron beam within tube 25 to step to the next target and also to advance the counter by a count of one. Thus the count of the binary counter designates or identifies both the target upon which the electron beam in tube 25 falls and also the calling line which is assumed to be the line designated 14 in the drawing. Generally the count of the binary counter which identifies the respective calling lines will not be the directory number of the lines but may be such number or represent such number when desired.

Indicating devices 1070 and 1071 are connected in the cathode circuits of tubes 1040 and 1041 and have discharges initiated through them at substantially the same time discharges are initiated in the corresponding register tubes 1040 and 1041, thus indicating to an attendant the identity of the calling line. It is to be understood of course that relays, switches or other indicators or other types of mechanisms may be employed in addition to or in place of the gas tube indicators 1070, 1071, etc., for indicating the identity of the called line or for responding to the call from the called line in any desired manner. These responsive devices may actuate other switching devices, signals, buzzers, lamps and the like.

In addition, the initiation of a discharge through the register tubes 1040, 1041, etc., causes the anodes of the tubes through which discharge is initiated to fall to a relatively low voltage with the result that the voltage applied to the diodes 155, 156, etc., also falls to a relatively low value. Consequently, the voltage applied to the grid of tube 911 also falls to this low value so that the output of tube 911 is no longer sufficient to permit positive voltages to be transmitted through the gate circuits 731, 732, etc., and as a result the register circuits will remain in the condition indicating the identity of the calling line until restored by an attendant or by other means.

When it is desired to restore the register circuits described above to their initial or zero condition key 1051 will be operated which applies a more negative voltage to the grid of the left-hand section of tube 1050 for a short interval of time during the charging time of the small condenser 1052. As a result of cross coupling of the monostable circuits of tube 1050 the current flowing through this section is interrupted and current flow through the right-hand section of this tube initiated. As a result, the voltage applied to the diode 154 is reduced so that further signals or high positive pulses received over conductor 148 can not be relayed to the grid of tube 911 even if and when the other input controls described herein would otherwise permit pulses to be repeated from conductor 148 to the grid to tube 911. In addition, the voltage of the left-hand anode of tube 1050 becomes more positive and is applied through the right-hand terminals of gates 731, 732, etc. As a result positive voltage is applied to the grids of the restoring tubes 1060, 1061, etc., during the application of synchronizing pulses to the gate circuits 731, 732, etc.

The application of positive voltages to the control elements of tubes 1060 and 1061 causes these tubes to conduct current with the result that the voltage of their anodes and the anodes of the register tubes 1040, 1041, etc., is reduced. The voltage of the cathodes of the register tubes is maintained at the voltage resulting from the discharge current flowing through the cathode resistor by the condenser connected around that resistor. The reduction of the anode voltage of these tubes 1040, 1041, etc. is sufficient to reduce the voltage between the anodes and cathodes of these tubes below the sustaining voltage required to maintain a discharge through them. As a result, the discharge through these register tubes is interrupted and the register circuit restored to normal. Likewise, the indicating tubes 1070 and 1071 are also restored to normal, thus cancelling the indication of the previously calling line.

Thereafter as condenser 1053 continues to charge the voltage of the grid of the left-hand section of tube 1050 approaches the voltage of the grid of the right-hand section. When these two grid voltages differ by less than the magnitude of the negative pulses as applied to the cathodes of both sections of tube 1050 the next delayed negative synchronizing or timing pulse applied to the cathodes of this tube causes the grid-to-cathode voltage of the left-hand section to become sufficiently positive to initiate a flow of current through the left-hand section of tube 1050 which in turn, due to the cross-connections between the sections of this tube, causes the current flowing through the right-hand section to be interrupted. As a result the voltage of the anode of the left-hand section falls to a relatively low value so that no further pulses are transmitted through the right-hand terminals of the gate circuits 731, 732, etc. In addition, the voltage of the left-hand section of tube 1050 rises so that positive voltage is applied to the diode 154 thus indicating that the register circuit is again in condition for responding to other X signals recorded in channel J.

The X signals recorded in the various channels as described above may be canceled or removed by applying O signals to the corresponding recording amplifiers in response to the opening of key 10 of line 14, for example, with the result that after a predetermined time of positive signals or pulses on the XO lead at times assigned to line 14, for example, or after a predetermined number of said signals have been received over this lead, timer circuit 270 functions and causes zeros to be written in all of the channels G1 and J which may have X's stored in them in the individual areas assigned to the respective calling lines.

It is thus evident that the calling arrangement described is capable of recording a call originating on any one or more of a plurality of lines and then register and indicate this fact and the identity of the line over which the calling signals originated. That portion of the equipment required to indicate these signals may later be restored to normal whereupon it is ready to register and indicate the signals received over the next line the elemental areas of which have a complete series of signals recorded in them and which next pass under the pole tips of the pick-up coils. The identity of this line is also indicated. It is also evident that calls from all of the lines may all be substantially simultaneously recorded by the magnetic recording equipment and the associated cathode-ray tube 25 of the scanning or distributor mechanism.

When desired, the anode of the left-hand section of tube 1050 or the output of the repeating tube 911 may be connected to the right-hand side of gate circuit 231 and cause a zero to be recorded in channel J in the elemental area of this channel assigned to line 14, for example, with the result that after the indication of a call has actuated the register circuit and equipment in the X in this elemental area of channel J will be canceled and changed to an O signal.

Figure 3:
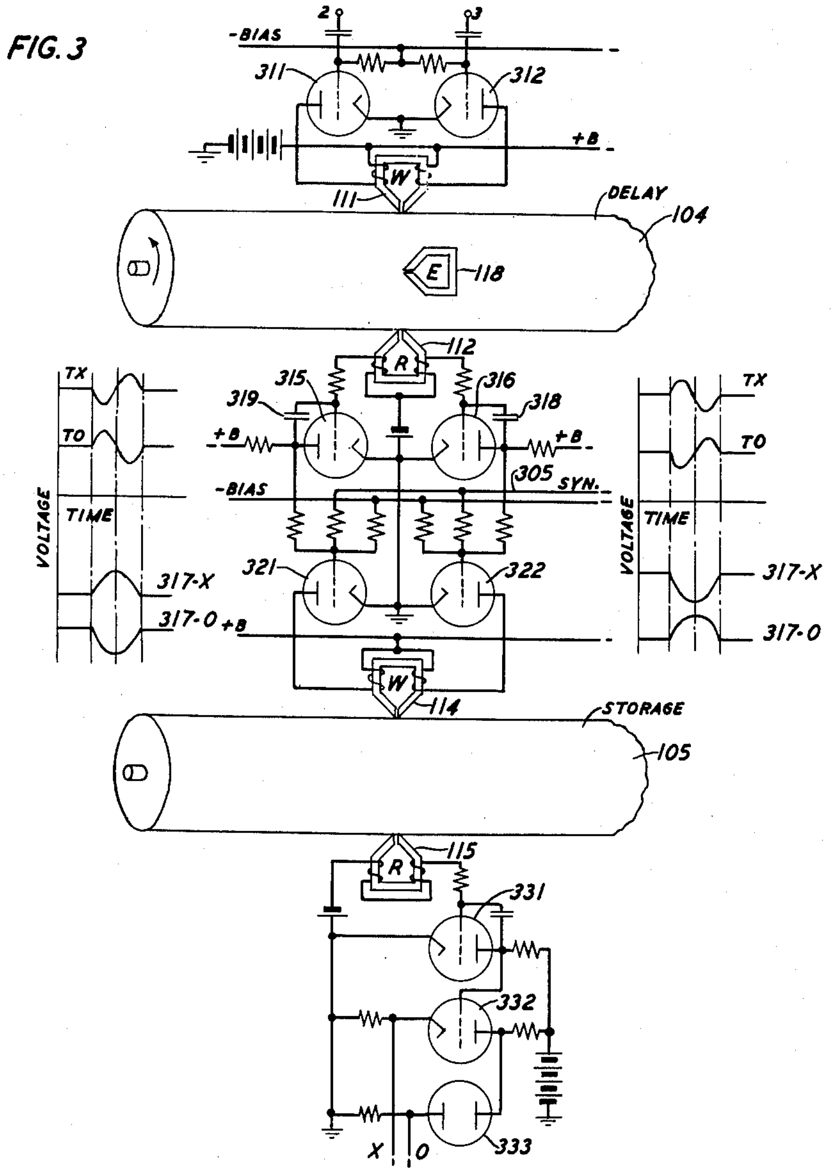
Fig. 3 shows detailed circuits for recording, recovering, transferring and finally reading signals stored in a magnetic drum in accordance with the exemplary embodiment of this invention.

Details of the recording amplifiers, recording coils, pick-up coils, pick-up amplifiers and transfer amplifiers and equipment are shown in Fig. 3. Here the two sections of the drum are illustrated as two drums wherein the delay drum or section of the drum is illustrated by drum 104 and the storage section by drum 105. The recording amplifiers, such as 110, are illustrated by tubes 311 and 312. These tubes may be separate tubes as shown in the drawing or they may be sections of a twin tube. The tube 311 is employed to write or record X's in the elemental areas of the corresponding channel, while tube 312 is employed to write or record zeros. Thus, each time a positive pulse is applied to the No. 2 terminal and thus through the coupling condenser to the grid of tube 311 current flows in the output or anode-cathode circuit of this tube and through the X winding of the recording or writing coil 111, for example. Conversely, when a positive pulse is applied to the No. 3 terminal positive voltage is applied through its coupling condenser to the grid of tube 312 with the result that current flows in the output circuit of tube 312 and through the O winding of the recording coil 111, causing a zero to be recorded in the elemental areas passing under this coil at this time.

The elemental areas recorded by the recording coil 111 then rotate part way around the delay drum 104 and pass under the pick-up coil 112, for example, and induce voltages in the two output windings of this coil. These voltages have the wave forms illustrated by the small curves designated TX and TO in response to an X signal or an O signal passing under the pick-up coil 112. These voltages are applied through respective resistances to the grids of tubes 315 and 316. As shown in the drawings, tube 315 has a condenser connected between its anode and grid which condenser in combination with said grid circuit resistance causes the combined circuit to operate as an integrating device and in effect integrates the signal applied to the control grid of this tube. Likewise, tube 316 has a condenser 318 similarly connected and integrates the voltage wave form applied to the control element or grid of tube 316 with the result that the output wave form of the anodes of these tubes is as illustrated by the curves designated 317–X and 317–O. It is to be understood that the tubes 315 and 316 represent a suitable amplifier which may comprise one or more stages of amplification, depending upon the extent of amplification required and the accuracy of the integration necessary. The output of the integrating tubes 315 and 316 is connected to the control grids of tubes 321 and 322, respectively. These grids are also biased so that in the absence of a signal applied to them substantially no current flows in their output circuits. In addition, these grids are connected to a source of synchronizing signals received over lead 305 so that when positive synchronizing signals are applied to lead 305 and the voltage from either tube 315 or 316 is at a high positive, current will flow in the corresponding tube 321 or 322 and cause a corresponding X or O signal to be recorded in its elemental area under the recording coil 114 at this time.

Thereafter, the signal or signals are carried around the drum 105 and pass under the pole tips of the pick-up coil 115. The output of coil 115 is applied to the integrating tube 331 and integrated as before and then repeated by tube 332. The integrated signal applied to the grid of tube 332 comprises a voltage of relative high amplitude in response to an X signal passing under the pole tip of coil 115 so a high positive voltage is repeated by the cathode of this tube to the X output lead. Conversely, the integrated signal applied to the input of tube 332 comprises a voltage of relative low amplitude in response to an O signal passing under the pole-pieces of the coil 115. Consequently, the anode of tube 332 is at a high positive voltage and this positive voltage is coupled through a gas or high vacuum diode 333 to the O output lead where it causes a high positive voltage to be applied to this lead. These voltages are employed in the circuits as described herein to control the various other recording and indicating circuits. The change in voltage applied to the O lead in response to an X signal passing under the pole tips and the change in voltage applied to the X lead in response to an O signal passing under the pole tips of the pick-up coil are both of low magnitude.

After the signal recorded by the recording coil 111 as described above passes under the pick-up or reading coil 112, it will pass under the erasing coil 118 and be erased in the manner described hereinbefore whereupon the elemental area applied to the respective lines is again in condition to respond to signals recorded by the recording coil 111.

It should be noted that the pick-up coils as shown in Fig. 1 have their pole-pieces oriented with respect to the cylinder such that the air gap extends circumferentially around the cylinder. Consequently, the recording coils orient the magnetic vectors circumferentially around the cylinder in their respective channels. As shown in Fig. 3 the air gap is shown extending along the axis of the drum and at right angles to the arrangement shown in Fig. 1. The coil 118 has likewise been shown rotated 90 degrees from that shown in Fig. 1. It is to be understood that the recording and pick-up coils as well as the other equipment operate with the coils in either orientation. However, in an exemplary embodiment the coils have been actually oriented as shown in Fig. 1. The air gaps of the coils have been rotated through substantially 90 degrees in the showing of Fig. 3 to aid in the drawing and understanding of the manner in which the various coils are located one relative to another and the flow of signals or pulses from the first recording coil through the delay drum and then to the storage drum and finally to the final pick-up coil from the storage drum. It is to be understood, of course, that when desired the coils may be arranged as actually shown in Fig. 3 and a satisfactory operation will be obtained when the coils are so arranged.

As shown in Fig. 1, a number of gate circuits 201, 211, 221, 231, 251, 731, 732, etc., are provided and each of these gate circuits comprises a plurality of diodes. In general, these gate circuits comprise two different types of arrangements. In one arrangement the voltages applied to all of the input leads must be of a given polarity before this polarity is repeated through the gate circuits. Such gate circuits are frequently called "and" circuits or "all" circuits. In another form the diodes are arranged so that if a voltage of a given polarity is applied to any of the leads it will be repeated to an output circuit. Such circuits are frequently called "or" or "any" combining or gate circuits. In the case of the "and" circuits the voltages are applied in a direction opposed to the direction of conduction of the diodes whereas in the "or" circuits the voltages are applied in the direction of conduction through the diode circuit. Various combinations of these different elemental types of combining circuits are employed as described in reference to Fig. 1. In addition, more complicated arrangements are repeatedly employed in a more comprehensive embodiment of this invention shown in Figs. 4, 5, 6 and 7.

In order to simplify the disclosure of these figures and aid in the understanding of them, these gate circuits have been classified into different groups and represented by symbolic designations. The complete gate circuits, together with the corresponding simplified representation of them, are shown in Figs. 12A, 12B, 13A, 13B, 14A, 14B, 14C, 15A, 15B, 16A, 16B, 17A and 17B. In all of these circuits the No. 1 terminal is arranged to be connected to a source of synchronizing pulses as described herein. Terminal 2 is connected to the terminal or lead of the recording amplifier or other utilizing or indicating device which records or indicates an X signal, whereas terminal 3 is similarly connected to record or indicate an O signal.

As illustrated in the exemplary embodiment set forth herein these gate circuits are all arranged to employ or transfer positive pulses over the various output leads in response to positive pulses applied to their input terminal. It is to be understood of course that the polarities of the various diodes may be reversed and the system arranged to respond to negative pulses applied to the various leads, or when desired, certain of the gate circuits may be arranged to respond to and repeat positive pulses, whereas others of the gate circuits may be employed to respond to and repeat negative pulses. It is also to be understood that when desired the input or output to the various gate circuits may be repeated, amplified, shaped or otherwise controlled by repeating tubes, circuits and apparatus.

Figures 12A, 12B, 13A, 13B, 14A, 14B, 14C, 15A, 15B, 16A, 16B, 17A, 17B:
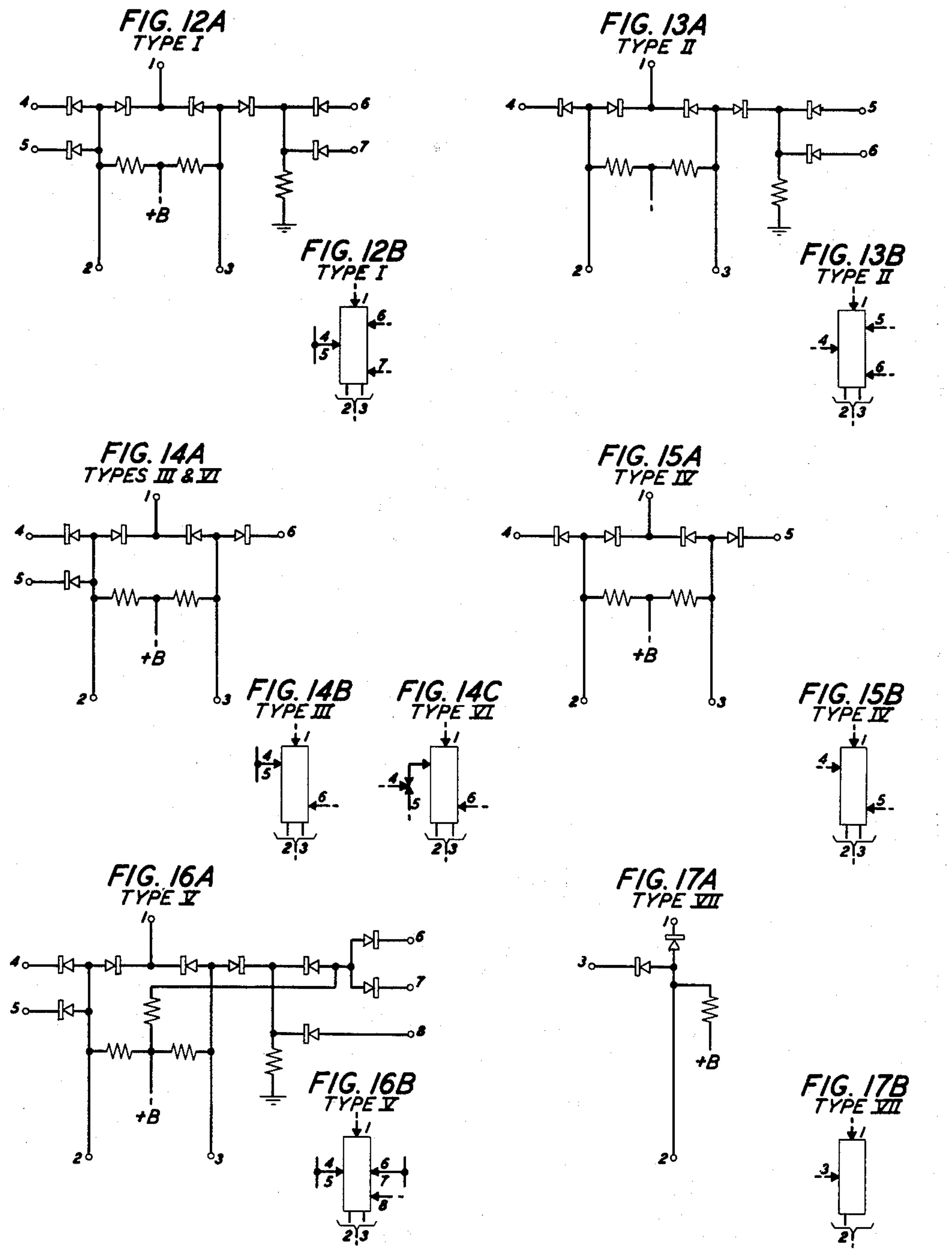
Figs. 12A, 12B, 13A, 13B, 14A, 14B, 14C, 15A, 15B, 16A, 16B, 17A, 17B show in detail control or gate circuits employed controlling the recording amplifiers or recording signals of the magnetic drum as well as simplified schematic representations of these gate circuits.

The left-hand terminals of each of the figures are arranged to respond to high positive voltages applied to them for recording X signals, whereas the right-hand terminals are arranged to respond to high positive signals for recording O signals. As shown in Fig. 12A the left-hand inputs for recording X signals are arranged so that a positive pulse has to be applied to both of the input leads 4 and 5. When a pulse of positive polarity is applied to both the input leads 4 and 5 and a positive synchronizing pulse applied to the No. 1 terminal, a positive output pulse is repeated to the output terminal 2. However, in the absence of any of these three positive input pulses no output pulse is applied to output terminal 2 because the impedance of any of the input circuits connected to the terminals to ground or to a small positive voltage or a negative voltage is low in the absence of a positive voltage applied to them and in effect shunts the positive pulses applied to all of the other input terminals so that substantially none of the voltages of these other pulses appears at the output terminal 2. A corresponding simplified designation is illustrated in Fig. 12B which shows two leads connected to the input arrow on the left-hand side thus indicating that positive voltage must be applied to both of these leads in addition to the positive synchronizing pulse in order to obtain a positive output at the No. 2 terminal or lead. Terminals 6 and 7 of Fig. 12A are arranged so that the application of a positive pulse to either lead 6 or 7 in combination with the application of a positive pulse to the synchronizing input terminal 1 causes a positive pulse to be applied to the output lead 3. It is to be understood that the polarity of the diodes applied to leads 6 and 7 is reversed from the polarity of the diodes connected to leads 4 and 5 and that an additional diode is interposed between lead 3 and terminals 6 and 7. Here, positive voltage applied to either lead 6 or 7 is repeated through the respective diode and then when positive voltage is applied to terminal 1 is repeated to lead 3. Fig. 12B shows the corresponding simplified designation of such a circuit wherein two input arrows are shown on the right-hand side connected to individual leads. In Fig. 13 a single X input lead is shown on the left and an arrangement similar to the arrangement shown in Fig. 12A for repeating O signals is shown at the right. Fig. 14A shows an X input circuit similar to that shown in Fig. 12 and a single O input circuit. Fig. 14B shows the corresponding simplified designation. The configuration shown in Fig. 14A may be employed in a somewhat different manner from that described above. For example, if the No. 4 input terminal is normally connected to a positive voltage and No. 5 to ground or negative voltage, then a positive pulse is repeated on the output lead 2 in response to the simultaneous application of each positive pulse applied to the input terminal 5 and each synchronizing pulse applied to the No. 1 terminal. However, if a negative pulse is also simultaneously applied to the No. 4 terminal this negative pulse blocks the repeating action and prevents the repetition of a positive pulse on the output lead. This blocking arrangement is shown in the simplified designation or representation of Fig. 14C.

The arrangements shown in the remaining figures are similar to the arrangements described above. Fig. 15A and 15B show arrangements wherein a single input is employed for writing either X or O signals. Figs. 16A and 16B show a more complicated arrangement for controlling the writing of O signals. Here the arrangement for controlling the writing of X signals is similar to the arrangement shown in Figs. 12A and 12B. However, for recording or responding to O signals three input terminals are shown. In this case the application of a positive voltage to terminal 8 causes a positive pulse to be repeated on the output lead 3 upon the application of a synchronizing pulse to terminal 1. With respect to terminals 6 and 7, however, it is necessary that a positive pulse be applied to both of these terminals before a positive pulse is repeated over the output lead 3 in response to the application of a positive synchronizing pulse to terminal 1. Thus a high positive pulse applied to terminal 8 or a high positive pulse applied to both terminals 6 and 7 are necessary to permit a synchronizing pulse to be transmitted to terminal 3. Fig. 16B shows the corresponding simplified representation of this circuit arrangement. Figs. 17A and 17B show a simplified gate circuit wherein positive voltage is repeated on the output terminal 2 upon the application of a positive voltage to input terminal 3 and the application of a positive synchronizing pulse to terminal 1.

Figs. 4, 5, 6 and 7 show a more comprehensive call receiver suitable for use as a more complex annunciating system calling device and also suitable for use as a dial pulse register to receive calls in an automatic communication switching system.

Figure 7:
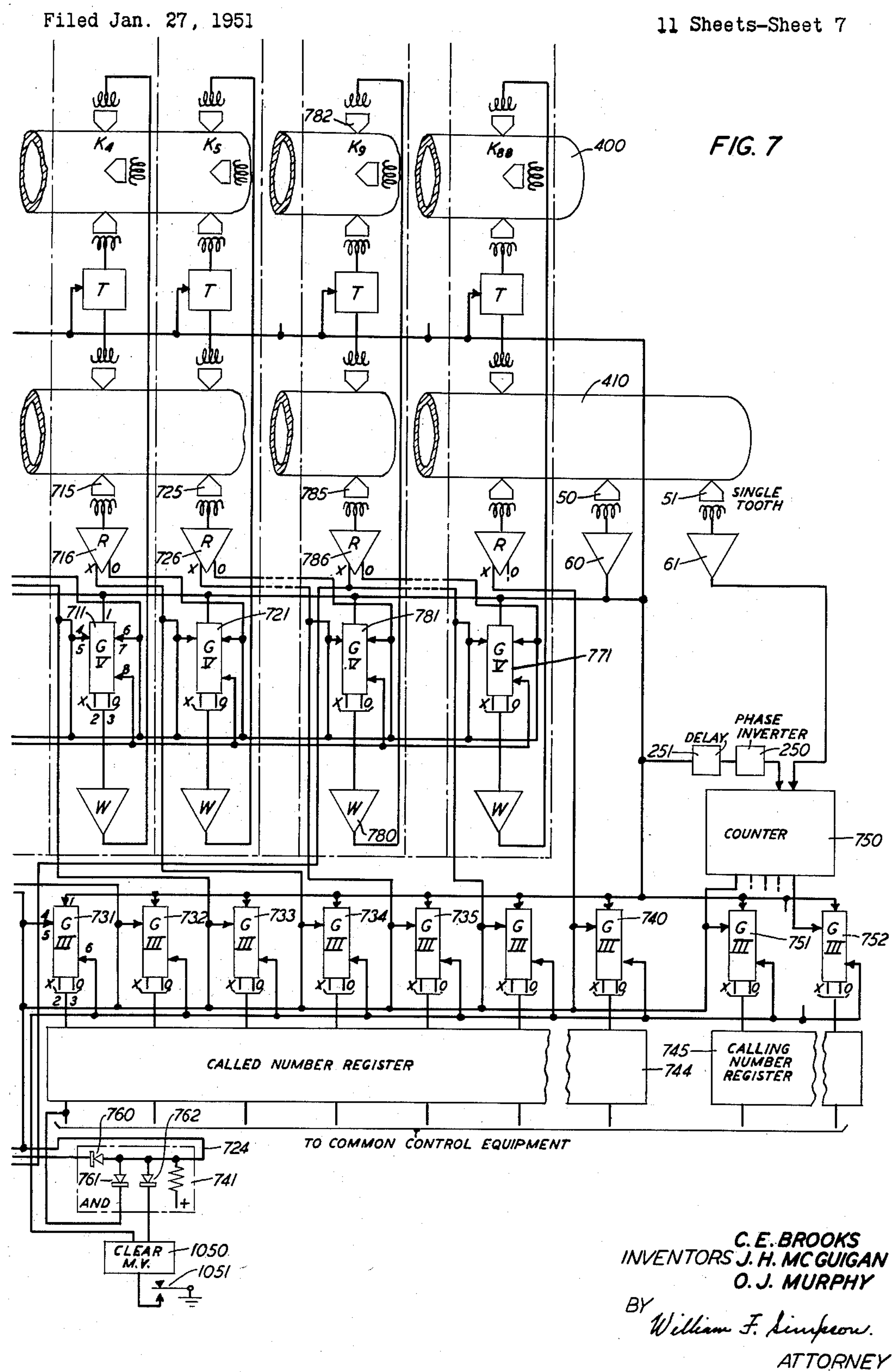
Figures 9, 20:
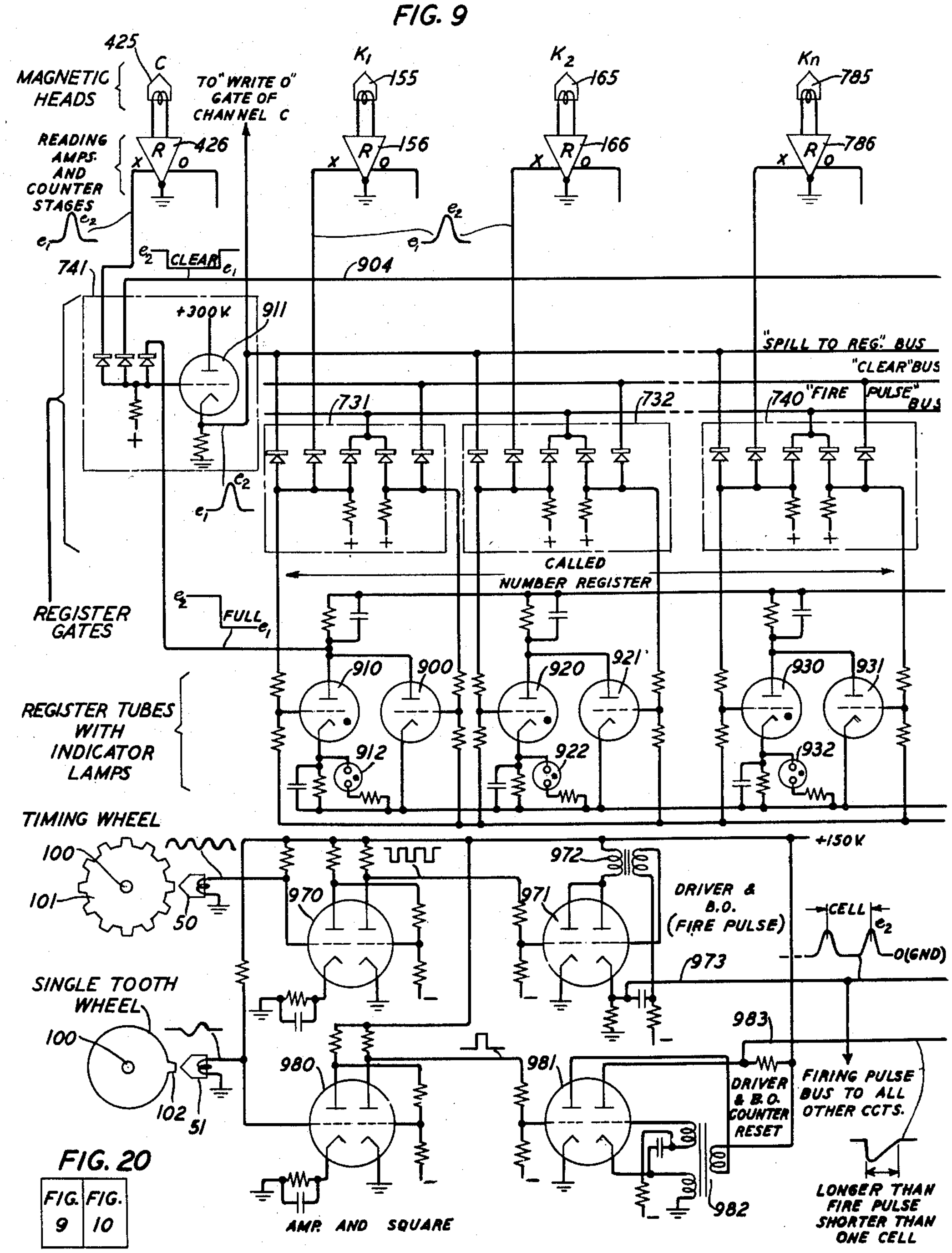

In Figs. 4, 5, 6 and 7 the two toothed wheels 101 and 102 have not been shown in detail associated with the pick-up coils 50 and 51. However, the showing in Fig. 7 is intended to be merely a schematic showing so that when desired a multiple toothed wheel 107 will be provided for coil 50 and the single toothed wheel 102 for coil 51 as shown in Figs. 1 and 9.

However, it is understood that when desired suitable timing pulses or signals may be recorded on the surface of the magnetic drum and these signals employed in a corresponding manner to synchronize and time the operation of the various circuits in the manner set forth herein. In this case the cells or elemental areas comprising a channel which pass up under the pick-up coil 50 will be provided with an X signal in each of the cells or elemental areas thereof whereas in the channel associated with coil 51 only a single X signal will be recorded in one cell thereof. When the signals are thus recorded by any suitable means including oscillators, pulse generators, and other control circuits, the signals recorded in these synchronizing and control channels may be employed to actuate the control circuits in the same manner as toothed wheel generators described herein with reference to Figs. 1 and 9.

In these figures the separate functions of the drum mechanism have been shown on two drums. Drum 400 is employed as a delay mechanism while drum 410 is employed to store the desired information. As in the case of Fig. 1, both of these drums may comprise a portion of a single magnetic drum or they may comprise separate drums as shown in Figs. 4, 5, 6 and 7. In either case the drums are rotated at a substantially uniform speed and in the case of two drums both drums are rotated in synchronism. The delay drum comprises a plurality of recording coils or devices 402, 412, 422, 432, 442, 452, 502, 512, 522, 532, 572, 582, 111, 121, 131, 141, 151, 161, 171, 782, etc., shown at the top of Figs. 4, 5, 6 and 7. These recording heads are connected to the writing or recording amplifiers 420, 430, 440, 450, 500, 510, 520, 530, 570, 580, 110, 120, 130, 140, 150, 166, 170, 780, etc., shown across the lower portion of these figures. The delay drum also has associated with it a plurality of pick-up coils such as 112 and 122 and a group of erasing coils such as 118 as shown. The delay drum is rotated such that a given elemental portion or area of the drum first passes under an erasing head magnet and then under a recording coil, then under a pick-up coil, and then back to the erasing coil or magnet. The signals recorded on this drum thus pass under the pick-up coils after a predetermined delay interval depending upon the spacing of the recording and pick-up coils and the speed of the drum. The pick-up coil signals pass through the amplifier to a recording coil adjacent the recording or storage drum where they are recorded in the recording drum and later pass under the pick-up coils adjacent to the recording drum.

As in the case of Fig. 1 the output of the pick-up coils adjacent the delay drum is either zero or no current or a voltage or current of one or the other of two polarities due to the recording in the drum of either of one of two different signals referred to for convenience as X signals and O signals. The delay drum is magnetized by the erasing heads in a direction so that no output voltage is induced in the pick-up heads unless a signal is recorded by the recording coil associated with the same channel of the drum. This magnetic condition is established in the drum prior to recording any signals by any of the recording coils associated therewith. All of the channels on the storage drum or storage portion of the drum previously are magnetized in the same direction as O signals so that the pick-up coils associated with these channels or sections of the drum will have output voltages corresponding to recorded O signals, i. e., a low or zero voltage. However, the channel on the storage drum associated with the pick-up coil 125 may be magnetized in a manner similar to that described above with respect to the delay channels of the drums. This channel may be also magnetized in the same manner as all the other channels on the storage or delay drum in which case the erasing head is oriented to magnetize the drum in the direction of O signals. As a result the output from the pick-up coils 115, 125, 135, etc., shown in Fig. 6 as well as corresponding pick-up coils shown in Figs. 4, 5 and 7 apply voltages corresponding to O signals to their associated amplifiers unless and until an X is recorded in any of the cells and elemental areas of these channels. The output or reading amplifiers 116, 126, 136, etc. of Fig. 6, as well as the corresponding amplifiers of the other figures are arranged to have a high positive output voltage on the designated lead in response to a recorded signal of the corresponding character passing under the respective pick-up coils. Thus in the case of amplifier 156, for example, the output voltage on lead O will be a high positive voltage and the output voltage on lead X a low positive voltage each time an O signal recorded in the drum passes under the pick-up coil 155. Likewise a high positive voltage is applied to the X lead and a low positive voltage is applied to the O lead each time an X signal passes under the corresponding pick-up coil 155.

Assume now that it is desired to record the history of a plurality of voltage conditions of one or more of the lines 14 or 15 or other corresponding lines shown in Fig. 1 on the recording mechanism shown in Figs. 4, 5, 6 and 7. The signals from the scanning mechanism as repeated to lead 45 of Fig. 1 through the cathode-follower tube 46 may be amplified and otherwise shaped and controlled by amplifier 44 when desired and then applied to gate circuits 201 and 211 in a manner similar to the manner described above with respect to Fig. 1. When current flows over the corresponding calling lines such as line 14 in response to the closure of switch 10 positive voltage is applied to lead 45 which voltage is transmitted through the gate circuit 201. As pointed out above an O signal will be passing under pick-up head 115 at this time due to the previous magnetization of drum 410 as described above. As a result high positive voltage appears on the O output lead from amplifier 116 which high positive voltage together with the high positive voltage from lead 45 occurring simultaneously therewith is transmitted through gate circuit 201 and causes a positive voltage to be transmitted over the X lead to the recording amplifier 110 thus causing an X to be recorded in the elemental area under the recording head 111 assigned to line 14. This signal then passes under pick-up head 112 through the transfer amplifier 113 and is recorded in an elemental area on drum 410 assigned to line 14. When this X signal appears under pick-up coil 115 it causes a high positive voltage to appear on the X output lead and a low positive voltage on the O output lead from amplifier 116. A high positive output voltage on the X lead is applied to combining circuit 251 as will be described hereinafter. The low voltage on the output O lead is applied to the gate circuit 201 in such a manner that high positive signals received over lead 45 produce no further output voltages from the gate circuit 201 to the amplifier 110 and thus do not cause further X signals to be recorded by the recording head 111 and later transferred to the recording channel. The X signal recorded in the elemental area of this channel assigned to line 14, however, remains recorded on the drum 410. Consequently, each time this signal passes under the pick-up head 115 it prevents further recording of X signals under control of the recording amplifier 110.

The high positive voltage applied to lead 45 in response to the closure of contacts 10 of line 14 as described above also causes a positive voltage to be applied to the gate circuit 211 which voltage is transmitted through the gate circuit 211 under control of the synchronizing pulse to the recording amplifier 120 which causes an X to be recorded by the recording coil 121 in the elemental area passing under this coil at this time. This elemental area is likewise assigned to line 14. The X signal is then transferred to recording drum 410 in the manner described above. After the signal passes under the pick-up coil 125 it is erased by the erasing head associated with this channel. The X signal is erased from the delay channel by the corresponding erasing magnet or coil. In the case of the second channel designated G2 at the top of Fig. 6, the X signal is recorded each time the elemental area assigned to line 14 passes under the corresponding heads as long as line 14 remains closed and causes an output voltage to be induced in the pick-up coils and related amplifier each time the recorded X signal passes under the pick-up coils. The output of the reading or pick-up amplifier 126 is also applied to the combining circuit 251. So long as cells having X signals recorded in them simultaneously pass under both of the pick-up coils 115 and 125, a high positive voltage appears on the X output leads from these amplifiers to the combining circuit 251. The application of a high positive voltage to both of these leads substantially simultaneously causes a high positive voltage on the XX lead from the combining circuit. The application of high positive voltage on the XX lead causes O signals to be recorded in the A and all the B channels. However, since O signals were previously recorded in these channels the high positive voltage on the XX lead produces no further effect at this time.

So long as the line 14, for example, remains closed, the above condition of the recording mechanisms remain as described above, each time the elemental areas of the various channels of the drums pass under the various recording and pick-up coils.

Assume now that the subscriber or attendant actuates the switch 10 or 20 in such a manner that next time the electron beam of the scanning mechanism described above passes over the target connected to line 14 no current will be flowing in this line with the result that a lower voltage is applied to lead 45 which voltage is insufficient to be transmitted through the gate circuit 211. As a result no X signal is recorded by the recording coil 121 in the elemental area assigned to line 14, as described above, with the result that the output of amplifier 126, the next time the area assigned to line 14 passes under pick-up coil 125, will be a high positive voltage or pulse on the O lead and low positive voltage on the X lead. These output voltages will continue in this manner, as long as line 14 remains open, each time the section of the drum assigned to line 14 passes under the pick-up coil 125. At the same time the X signal previously recorded in G1 channel passes under the pick-up coil 115 and causes a high positive voltage on the X lead and a low voltage on the O lead output from amplifier 116.

Inasmuch as O signals previously recorded in drum 410 pass under pick-up coil 135 at this time, a high positive voltage is applied to on the O output lead of amplifier 136 and a low voltage on the X lead from this amplifier. The above-described voltages are combined in the combining circuit 251 to produce high positive voltages on the output XO lead and also a high positive voltage on the XOO lead.

The positive voltage on the XOO lead is applied to the left-hand side of gate 221 and causes a positive voltage to be transmitted through gate 221 over the X lead to the recording amplifier 130 which voltage causes an X to be recorded by the recording coil 131 in the area assigned to line 14. During the next revolution of the drum this X signal is transferred to the storage drum and when the line 14 is again tested, this X signal passes under the pick-up coil 135 and causes a low voltage to be applied to the output O lead and a high positive voltage to be applied to the output X lead of amplifier 136. As a result a high positive voltage is still applied to the XO lead, but a low positive voltage is applied to the XOO lead because the signals recorded in the channels G1, G2 and H are now XOX instead of XOO. The above output voltages from amplifiers 116, 126 and 136 remain the same each time the areas assigned to line 14 pass under these pick-up coils so long as the line 14 remains open.

Turning now to the high positive voltages applied to the XO lead, the first time positive voltage is applied to this lead after the line 14 is momentarily opened by switch 10 or 20 in the manner described above, this positive voltage is transmitted to the upper right-hand leads of the gates 521, 531, 571, 581, etc., where it will cause a high positive voltage to appear on the output O lead of the gates and thus cause an O signal to be recorded by the corresponding recording coils. However, inasmuch as an O signal had been previously recorded in the corresponding portions of the channels on drum 410 at this time, the recording of another O signal over the previously recorded O signal produces no useful results.

The high positive voltage on the XO lead is also applied to the left-hand terminal of gate 431 and causes a high positive voltage to be transmitted over the output X lead from this gate to the recording amplifier 430 which in turn causes an X signal to be recorded by the recording coil 432.

The positive voltage on the XO lead is also applied to the left-hand terminals of gate circuits 401, 411 and 421. However, since a high positive voltage is also required from the output of the pick-up amplifiers of the next preceding channel in the sequence of the B channels and the A channel to produce an output on the X lead from these gate circuits and since an O signal is recorded in the corresponding elemental areas assigned to line 14 at this time, a high positive voltage on the XO lead causes no further results to be recorded at this time.

Upon sampling of the line 14 during the next revolution of the drums, if a subscriber's line 14 is still open, a high positive voltage will be again applied to the XO lead when the elemental areas assigned to this line again pass under the pick-up coils 115, 125 and the corresponding coils such as 435 and also under the recording coils 111, 121, 422, 432, etc. At this time the X signal previously recorded by recording coil 432 and transferred to the storage drum 410 passes under the pick-up coil 435 and causes a high positive voltage to appear on the X output lead of the amplifier 436. This voltage together with the high positive voltage on the XO lead at this time causes a high positive voltage to be transmitted through gate circuit 421 as well as through the gate circuit 431 with the result that an X signal is recorded by both the recording coils 422 and 432.

In this manner the number of revolutions of the drum during which the contacts 10 or 20 of line 14 are opened may be counted, each revolution causing the recording of an X signal by an additional recording coil of channels B1, B2, etc. If the line remains open an X will eventually be recorded by the pick-up coil 402 and on the next revolution of the drum the X will pass under the pick-up coil 405 and cause the circuits and the recorded signals to be restored to their initial condition as will be described hereinafter.

Concurrently with the recording of the signals in response to the operation of the equipment with respect to line 14 as described above similar signals may be recorded for any or all of the other lines during the successive sampling periods of the other lines. These other signals will of course be stored in the various cells comprising the slots assigned to these other lines respectively.

Assume, however, that the contacts 10 or 20 of line 14 are opened only momentarily so that they reclose again before the drum rotates a sufficient number of times to cause an X to be recorded by the recording coil 402.

When the contacts 10 or 20 reclose positive voltage is again applied to lead 45 the next time the electron beam of the scanning mechanism tests the line 14. As a result an X is recorded by the recording coil 121. With the next revolution of the drums an X will again be recorded by the recording head 121 assuming line 14 remain closed and an X passes under the pick-up coil 125 with the result that a high positive voltage is again applied to the X output lead and a low voltage to the O output lead from amplifier 126. As a result a high positive voltage now appears on the XX lead from the combining circuit 251 instead of on the XO lead. A high positive voltage applied to the XX lead is transmitted through the right-hand side of gate circuits 401, 411, 421 and 431 with the result that a positive voltage is applied to the output O leads from these circuits to the associated recording amplifiers such as 420, 430, etc. causing O signals to be recorded by the recording coils 402, 412, 422, 432, etc., so that all of the previously recorded X's in the elemental areas assigned to line 14 in channels B1, B2, etc., are changed to O signals at this time thus restoring elemental areas or registers of the counting mechanism assigned to line 14 to their initial condition.

Figure 8:
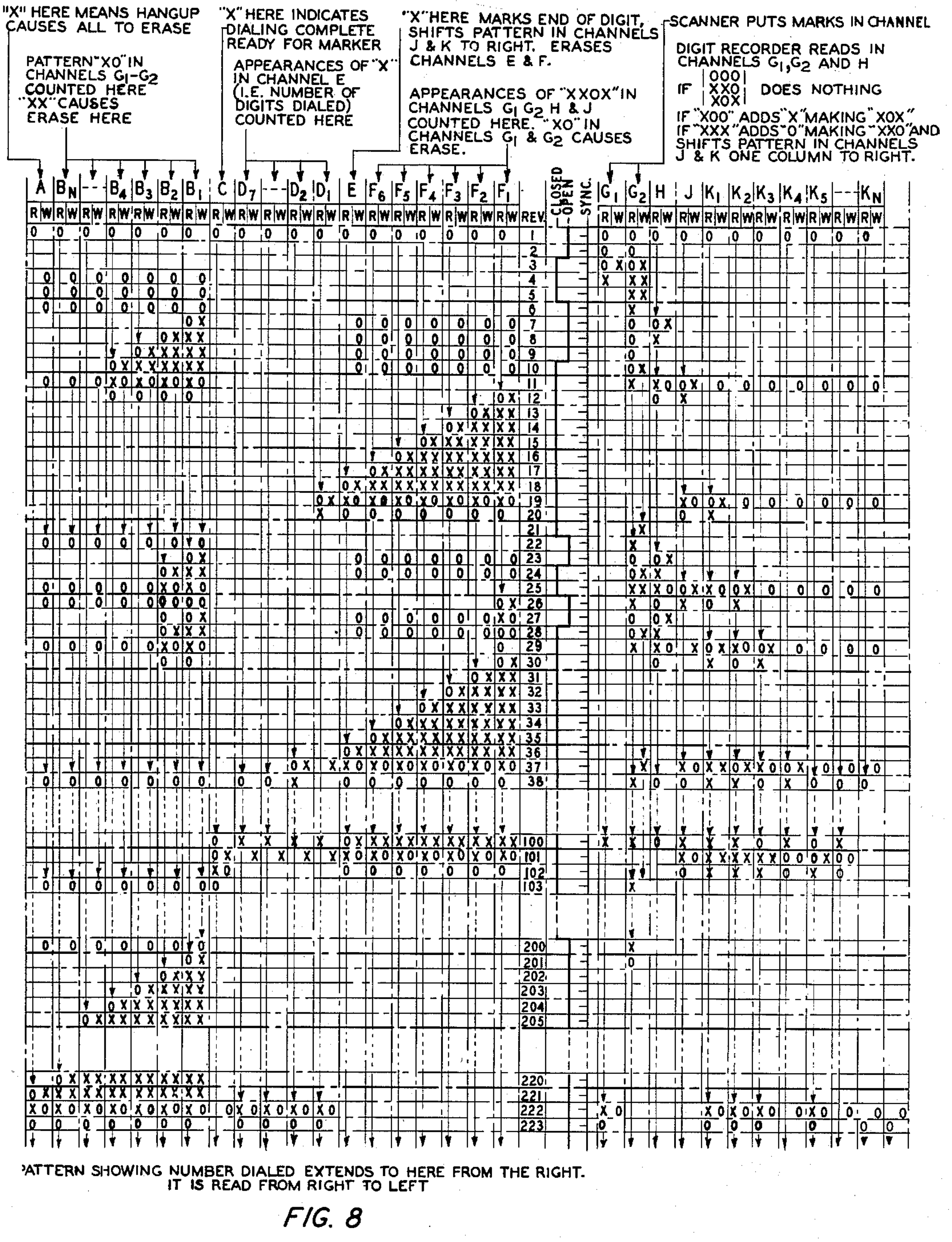
Fig. 8 shows in chart form the various signals recorded at various places in the magnetic drum during the receiving of a call.

The above-described operation is further illustrated by the table shown in Fig. 8. The table shown in Fig. 8 shows the signals applied to and recorded by the recording coils during that small period, in each revolution, when line 14 is sampled and the elemental areas or cells assigned to line 14 are under the various pole tip of the recording and pick-up coils as a result of the current conditions in line 14. This table also shows the output signals obtained from the pick-up coils as a result of the signals recorded under control of line 14. The various recording channels are designated by letters across the top of these figures, which letters or designations are the same as appear across the top of Figs. 4, 5, 6 and 7 for each of the recording coils. These figures designate the channels in both drums and thus also the transfer mechanism and the pick-up coils, as well as the respective amplifiers associated with each of these coils. In the table each of the channels has two columns, the left-hand column designated R which illustrates the voltage or output signals from the pick-up or reading coils such as 405 through 455, 505 through 585, 115 through 175 and 715 through 785. The right-hand column for each channel designated W illustrates the signal supplied to each of the recording or writing coils shown across the tops of Figs. 4, 5, 6 and 7. The horizontal rows of Fig. 8 have been numbered in the column marked REV to indicate the revolutions of the two drums, namely, 400 and 410. The signals shown are those recorded in only the elemental areas assigned to line 14, it being understood that similar signals can be recorded and read from other elemental areas assigned to other lines which will pass under the various recording and pick-up coils at successively different intervals of time.

It is also noted that the signals associated with line 14, for example, for any given revolution of the drum, appear in a straight row across these columns. Likewise the various pick-up and recording coils are shown arranged in a substantially straight line along the respective drums. These figures have been arranged in this manner to aid in the description and understanding of the various features and elements of applicants' invention and the manner in which they operate and cooperate one with another. However, it is to be understood that the various elemental areas assigned to any given line on the respective drums do not necessarily line up in a straight line axially along a surface of the drum. As a matter of fact, in the usual case, these elemental areas may be assigned arbitrarily in a desired manner in the various channels along the drum so long as they appear substantially simultaneously under the pick-up or recording coils. Thus all of the elemental areas assigned to line 14 on drum 400 should substantially simultaneously pass under the recording coils shown across the tops of Figs. 4, 5, 6 and 7. Likewise, all of the elemental areas assigned to line 14 on the storage drum 410 should substantially simultaneously pass under the pick-up coils shown in the middle of the above Figs. 4, 5, 6 and 7. In addition, the elemental areas assigned to line 14 on drum 400 should pass under the recording coils across the tops of these figures at substantially the same time the elemental areas assigned to line 14 on drum 410 pass under the pick-up coils shown in the middle of these figures.

As shown in Fig. 8 and described hereinbefore, the output from the pick-up coils and thus the output from the reading amplifiers is either an O or an X. It is further assumed that when the output from these amplifiers is an O signal a high positive voltage appears on the O output lead and a low or more negative voltage on the X output lead. Conversely, when the output is an X due to an X passing under the corresponding pick-up coil, the voltage on the output X lead is high or more positive and the voltage on the output O lead is low or more negative.

As described above, the recording drum 410 is previously magnetized so that all of the outputs are O. This is shown in the first line of the table of Fig. 8 which shows that the output from all of the reading amplifiers is an O.

The signaling condition of the calling line 14 assumed for illustrative purposes is also shown on Fig. 8. For the first two revolutions of the drum the line is shown open, consequently, no signals are recorded by any of the recording coils and only O's are present in the output of the pick-up or reading coil amplifiers. The synchronizing pulses from the synchronizing generator are also shown adjacent the line representing the signaling condition on line 14. These representations of timing or synchronizing pulses are shown to occur once during each revolution of the drum and represent only those synchronizing pulses which occur when the electron beam is directed towards the target connected to line 14 which is substantially the same time when the elemental areas of the drum comprising the slot assigned to line 14 are under the recording and pick-up coils. Other synchronizing pulses occur for each slot of the drum and thus for each target of tube 25 and for each line to which the tube 25 and magnetic drum are common. These pulses are of short duration and control the writing or recording of the signals on the amplifier as described herein.

Assume, as shown in Fig. 8, that line 14 is closed between the synchronizing pulses assigned to line 14 between the second and third revolutions of the drum. As a result, an X is recorded by the recording coils 111 and 121 of channels G1 and G2 as shown in line 3 of Fig. 8. On the next revolution of the drum, these signals will have been recorded in the storage drum 410 and cause X signals to appear on the output of the pick-up or reading amplifiers 116 and 126 as described above. The output X signal from amplifier 116 prevents further signals from being recorded in channel G1 by recording coil 111 as described above. In addition, the combining circuit in response to the positive voltages or pulses from amplifiers 116 and 126 causes a positive voltage or pulse to be applied to the XX lead which voltage in turn causes O signals to be recorded in the elemental areas assigned to line 14 of channel A and all the B channels. However, since O signals are present in these areas no further action takes place in response to the recording of these O signals. X signals continue to be recorded by the recording coil 121 so long as line 14 remains closed as described above. During this time no further action takes place. Thus as shown in Fig. 8, the signals recorded and read from the drum remain the same during this interval of time which is represented by revolutions three, four or five.

It is assumed that between the sample taken during the fifth and sixth revolutions the line 14 is opened and that such opening lasts for several revolutions of the drum. When the synchronizing pulse assigned to this line is then received no corresponding X signal will be recorded or written in channel G2 by the coil 121 and, as a result, on the next revolution an X signal is read by the pick-up coil 115 and an O signal by the pick-up coil 125 as shown in line 7. Inasmuch as an O signal had been previously recorded in channel H and appears on the output of the amplifier 136 at this time, positive voltages appear on the X output lead from amplifier 116, the O output lead from amplifier 126 and the O lead from amplifier 136. Consequently, a positive voltage appears on the XOO lead as described above and causes an X signal to be recorded in the H channel by coil 131 when the synchronizing pulse for the assigned seventh revolution of the drum is received.

Likewise, a positive voltage is applied to the XO lead which causes O signals to be recorded in each of the channels F1, F2, F3, F4, F5 and E and an X signal to be recorded in channel B1 by the recording coil 432. On the next revolution of the drums the output from the G1, G2 and H channels will be XOX, consequently, positive voltage no longer appears on the XOO lead and no further signals are recorded in the H channel by pick-up coil 131. However, so long as the line remains open a high positive voltage is impressed upon the XO lead during the sampling period of the respective line or lines for each revolution of the drums and an O signal is recorded in channels F1 through F6 and E as described above. Inasmuch as O signals are already recorded in the elemental areas assigned to line 14 for these channels the rerecording of O signals at this time produces no further effects.

However, as described above on revolution seven as a result of the first XO signal and thus the first positive voltage on the XO lead, and X is recorded in channel B1 due to the fact that the XO lead extends to the left-hand input of the gate circuit 431. During the next or eighth revolution of the drum this X signal appears on the output of the amplifier 436 due to the X signal passing under pick-up coil 435. As a result, positive voltage appears on the left-hand input to gate 421 in channel B2 when positive voltage is again applied to the XO lead on revolution eight. Consequently, an X is written or recorded by the recording coil 422 in channel B2 as well as by coil 432 of channel B1 in the elemental areas of these channels assigned to line 14. The above-described action is repeated each revolution of the drum so long as the line 14 remains open, an X being recorded in the elemental area assigned to line 14 in each additional succeeding B channel for each succeeding revolution of the drum.

Assume, as shown in the table, that after the ninth revolution of the drum the line 14 is again reclosed and, as a result, when the synchronizing pulse of the tenth revolution assigned to line 14 is received, an X signal is written in channel G2 by the recording coil 121. During this revolution nothing further happens except that an X is recorded in an additional one of the B channels in the manner described above. However, during the next or eleventh revolution of the drum, as shown in Fig. 8, an X appears in the output of amplifier 126, as well as amplifier 116, with the result that a positive voltage now appears on the XX lead as described above, which positive voltage extends to the upper right-hand input of the gate circuits 401, 411, 421 and 431 causing O signals to be recorded in the A and all of the B channels at this time. In addition during the sampling of line 14 on the eleventh revolution, an X signal is read by each of the channels G1, G2 and H thus causing a high positive voltage to be applied to the XXX lead, which high positive voltage causes an X signal to be recorded in channel J by recording coil 141 and an O signal to be recorded in channel H by the recording coil 131 due to the fact that the XXX lead extends to the right-hand side of the gate 221 and the left-hand side of gate 231, consequently, when the synchronizing signal assigned to line 14 is applied to these gates the above signals are recorded.

The high positive voltage on the XXX lead is also transmitted through the diode or rectifier 615 of the combining circuit 611 to lead 614 which lead extends to both sides of gate circuit 241, 167, 177, 711, 721, 781, etc., that is, this lead extends to both terminals 5 and 7 of these gate circuits. As described above and shown in Fig. 6, these gate circuits require a high positive input on both terminals 4 and 5 to cause an X signal to be recorded by the corresponding recording coil and a high positive signal to be applied to both inputs 6 and 7 or to input 8 to cause an O signal to be recorded.

At this time, when a positive voltage is applied to lead 614, the outputs from amplifiers 146, 156, 166, 176, etc. have a high positive voltage on their O leads and a low voltage on their X leads due to the fact that O signals are passing under the respective pick-up coils 145, 155, 165, 175, etc. As a result the voltage applied to the No. 4 terminals of the above gate circuits of the K channels is at a low value so no X signals are recorded in response to the high positive voltage applied to lead 614. However, a high positive voltage is applied to both terminals 6 and 7 of these gate circuits with the result that O signals will be recorded by the recording coils of all of the K channels as illustrated in Fig. 8 for the eleventh revolution of the drum during the sampling time of line 14.

At the sampling of line 14 on the next or twelfth revolution of drum 410, O signals will be read or received from the pick-up coils in channels A, all of the B channels, all of the C, D, E and F channels and, in addition, the signal output from channels G1, G2, H and J will be an XXOX with the result that a high positive voltage is applied to the XXOX lead which extends to the left-hand input terminal of gate 581 causing an X signal to be recorded in channel F1 by the recording coil 582. The XXOX lead also extends to other gate circuits individual to channels E and F2 through FN, i. e., F6 as shown in the drawing. However, the left-hand input terminal of these other gates also extends to the output of the previous or next lower numbered or preceding F channel in the sequence or group of F channels, which outputs are due to O signals previously recorded in these channels and now passing under the respective pick-up coils during the twelfth revolution, and as a result, no X signal is recorded in any of the other channels.

Assuming the line 14 remains closed for an appreciable period of time, as shown in the drawing, on sampling of line 14 on the next or thirteenth revolution a high positive voltage is again impressed upon the XXOX lead and this voltage again causes an X to be recorded in channel F1. The high positive voltage on the X output lead from the reading amplifier 586 of channel F1 causes an X to be recorded in channel F2. During the next sampling of line 14 during the fourteenth revolution of the drum 410 positive voltage on the XXOX lead causes X signals to be recorded in channels F1, F2 and F3. During each succeeding revolution upon the sampling of line 14 an X signal is recorded in an additional one of the F channels due to similar connections to those described above on the left-hand input side of the gate circuits. During the eighteenth revolution, assuming the above conditions of line 14 remain unchanged, an X signal is recorded in channel E by the recording coil 522. On the sampling of line 14 during next revolution of the drum 410, namely, revolution nineteen as assumed above, an X signal, i. e., a high positive voltage, is present in the output of channel E on the X output lead from amplifier 526 and, as a result, a high positive voltage is applied to the XRE lead, which lead extends to the lower right-hand input of the gate circuits 521, 531, 571, 581, etc., of the F channels causing O signals to be recorded in all of these channels. This lead is also connected to the right-hand input of gate 231 of the J channel so a positive voltage on the XRE lead also causes an O to be recorded in this channel. The XRE lead also extends to the combining circuit 611.

A high positive voltage on the XRE lead is repeated through the diode 621 of the combining circuit 611 and applied to both the right-hand and left-hand terminals of gate circuits of the K channels 241, 167, 177, 711, 721, 771, 781, etc. Since an X signal was previously recorded and appears as a high positive voltage on the X output lead from amplifier 146 at this time, an X signal is recorded in K1 channel. The outputs from all of the K channels, however, have high positive voltage on the O output leads with the result that O signals are rerecorded in all of the remaining K channels at this time as illustrated during the nineteenth revolution in Fig. 8.

As shown in the drawing the X output lead of amplifier 526 which is connected to the XRE lead also extends to the left-hand input lead of gate circuit 511 and also comprises one of the left-hand input terminals at the gates of the remaining D channels and to gate circuit 441 of the C channel. The high positive voltage on this lead causes the X signal to be recorded in the D1 channel thus indicating that the dialing of the first digit of the call, called number or station designation has been completed. The output of the X lead of amplifier 516 also extends to the left-hand input terminal of the gate circuit 501. However, during the twentieth revolution a high positive voltage is not applied to the other left-hand input lead to the gate circuit 501 with the result that the ouput from the X lead of amplifier 516 is ineffective to cause any signals to be written in the next or D2 channel. Thus during this twentieth and succeeding revolutions X signals appear in the output from only channels G1, G2, D1 and K1. The above-described conditions prevail as long as line 14 remains closed, which is assumed to extend through sampling period of the twenty-one revolutions of drum 410.

Assume now that the dial on line 14 has been actuated to transmit two pulses representing the second calling digit 2 from line 14. Also assume that the dial is released at such a time that line 14 will open sometime after the X signals have been recorded in channels E and D1, as described above. As shown in Fig. 8 it is assumed that line 14 is thus opened between the twenty-first and the twenty-second revolutions of the drum 410. Thus, during the twenty-second revolution an X signal is not recorded in channel G2 by the recording coil 121. Consequently, on the next or twenty-third revolution of the drum 410 an O signal appears in the output of the pick-up coil 125 and related amplifier 126 of channel G2. Consequently, at this time the output from G1 is X, G2 is O and the H channel also O. Consequently, positive voltage appears on the XOO lead and causes an X to be recorded by the recording coil 131 of channel H.

In addition a positive voltage is applied to the XO lead which causes O signals to be recorded in all the F channels and in channel E and X to be recorded in the B1 channel by the recording coil 432.

Also during the interval of this next or twenty-third revolution of the drum during which line 14 is sampled, it is assumed that line 14 is still open at the dial contacts. Consequently, an X signal is not recorded in channel G2 at this time. On the next or twenty-fourth sampling interval of line 14, therefore, an O signal is again obtained from the amplifier 126 of channel G2. During this sampling interval of line 14, however, the X previously recorded in channel H causes the output of amplifier 136 to have a high positive voltage on lead X and a low voltage on lead O with the result that a high positive voltage is no longer repeated to the XXX lead so that no further signals are recorded in channel H at this time. The high positive voltage is again applied to the XO lead which causes an X signal to be recorded in channels B1 and B2 at this time since an X signal appears at the output amplifier 436 of channel B1. O signals are again recorded in channels E and all the F channels.

It is further assumed that the line recloses between the twenty-third and twenty-fourth revolutions of the drum so that the line will be closed at time of twenty-fourth sample and thus an X signal will be recorded in channel G2, in the elemental area assigned to line 14. During the next or twenty-fifth sampling interval of line 14, a high positive voltage appears on the XX lead since X signals are present in the outputs of channels of G1 and G2 from amplifiers 115 and 125. A high positive voltage on the XX lead at this time causes O signals to be recorded in all of the B channels and the A channel. As a result an O signal is now recorded in all the B channels and the A channels. A high positive voltage is applied to the X lead from the output of each of the channels G1, G2 and H with the result that positive voltage also appears on the XXX lead which voltage is applied to the right-hand terminal of the gate circuit 221 and the left-hand terminal of gate circuit 231. As a result an O signal is recorded in channel H during this sampling interval by the recording coil 131 and an X signal is recorded in channel J by the recording coil 141 in the manner described hereinbefore. The high positive voltage on the XXX lead is repeated through the upper diode 615 of the "Or" circuit 611 to one of the right-hand and left-hand inputs of gates 241, 167, 177, 711, 721, etc. As a result the X signals recorded in the channel J and in the K channels are moved one channel to the right. In other words an X signal is recorded in channel K2 and an O signal in all of the other K channels.

During the sampling of line 14 during the next revolution of the drum 410 the outputs from channels G1, G2, H and J will be XXOX, respectively, which causes a positive voltage to be applied to the XXOX lead by the combining circuit 251 as described above which positive voltage causes an X signal to be recorded in channel F1.

Now, unlike the previously described series of events it is assumed that between the twenty-fifth and the twenty-sixth revolutions of the drum 410 line 14 is again opened by the dial. Consequently, during the interval assigned to line 14 during this twenty-sixth revolution an X is not recorded in channel G2. Consequently, during the sampling interval of line 14 the next or twenty-seventh revolution of drum 410 as shown in Fig. 8, the output from channels G1, G2 and H will be XOO with the result that a positive voltage is applied to the XOO lead which voltage in turn causes an X signal to be recorded in channel H in the elemental area assigned to line 14. During this twenty-seventh sampling interval an X appears in the output of channel F1 due to the recording of the X in channel F1 as described above in response to the XXOX signals recorded in channels G1, G2, H and J.

However, during the time of the twenty-seventh revolution, of the drum assigned to line 14, the outputs from channels G1 and G2 are X and O, respectively, with the result that a positive voltage is applied to the XO lead. At this time this voltage causes O signals to be recorded in all of the F channels and in channel E. In addition, an X signal is recorded in channel B1. Due to the recording of the signals described above, the output of channels G1, G2, H and J during sample from line 14 obtained during the next or twenty-eighth revolution of the drum 410 will be XOXX. As a result a positive voltage appears on the XO lead which voltage causes an X to be recorded in channels B1 and B2 since an X was previously recorded in channel B1 and also causes an O signal to be recorded in all of the F channels and channel E.

It is further assumed in Fig. 8 that line 14 again closes between the twenty-seventh and twenty-eighth revolutions of drum 410. As a result an X signal is now recorded in channel G2 during this twenty-eighth sampling period of line 14.

As shown in Fig. 8 it is assumed that the dial contacts maintain line 14 open and closed for equal periods of time. Such assumption is not required and is not usually encountered in telephone dial systems. Applicants' present system is not limited to such ratios of open and closed periods of the dial contacts. The only essential requirement is that the elemental areas assigned to given lines such as line 14 pass under the recording coils and pick-up coils at least once during each time the dial is open and at least once during each time the dial contacts are subsequently closed. Should the dial remain open or closed for longer periods of time during each of the signaling periods the circuits operate in substantially the same manner as described above and wait for each successive open and reclosure.

Thus during the sampling period assigned to line 14 during the next or twenty-ninth revolution of the drum 410 the output from channels G1, G2, H and J will all be X signals with the result that high positive voltage appears on the XX lead and also on the XXX lead. The positive voltage applied to the XX lead causes O signals to be recorded in the A channel and all of the B channels thus restoring the magnetic condition of the elemental areas of these channels assigned to line 14 to their initial conditions.

A high positive voltage applied to the XXX lead at this time causes an O signal to be recorded in channel H and an X signal in channel J since this lead extends to the left-hand terminal of the gate circuit 231 and the right-hand terminal of gate circuit 221. In addition, the XXX lead extends to the combining circuit 611 and through a diode or rectifier 615 in this circuit in a conducting direction with the result that positive voltage is applied to lead 614 at this time. Inasmuch as the output from the amplifier 146 of channel J has a high positive voltage supplied to its X lead in response to the X signal previously recorded in the elemental area of this channel assigned to line 14, an X signal is recorded in channel K1 by the recording head 151 because positive voltage is applied to both leads extending to the left-hand input terminal of gate 241. For similar reasons an X signal is also recorded in the K3 channel at this time. An O signal is recorded in channel K2 and in the remainder of the K channels at this time because an O signal was previously stored in all the next lower numbered K channels and thus a high positive voltage is received over the O output lead from the respective amplifiers 156, etc. of each of the K channels. Consequently, positive voltage is applied to both of the conductors extended to the upper right-hand terminal of the respective gate circuits causing O signals to be recorded in the remaining K channels. It should be noted that positive voltage is applied to one of the leads extended to the left-hand terminals of these gate circuits but that negative voltage from the output amplifier of the previous channel is applied to the other lead extended to the left-hand terminals of these gate circuits thus rendering the left-hand side of these gate circuits ineffective while the right-hand sides are effective to cause O signals to be recorded in these channels.

During the sampling period assigned to line 14 during the next or thirtieth revolution of the drum 410 the output from channels G1, G2, H and J will be XXOX, respectively, and as a result a positive voltage is applied to the XXOX lead which voltage in turn causes an X signal to be recorded in channel F1. At this time the output of the J and K1 channels is an X signal as shown in the table. During the next sampling interval assigned to line 14 the output from the channels remains the same as described above except that now an X signal appears in the output of the channel F1. As a result an X signal is recorded in channels F1 and F2. During each succeeding revolution during which the line 14 remains closed, an X signal is recorded in an additional one of the F channels in the elemental areas assigned to line 14.

The number of F channels provided determines the length of time to be measured as the interdigital pause in the dialed numbers. If a relatively long time interval is to constitute the interdigital pause a large plurality of F channels will be provided. Conversely, if a relatively short time is all that is required to indicate an interdigital interval then only a few F channels will be required. Thus the time interval of this pause is measured by counting the number of revolutions of the drum after the line is reclosed in the manner described above. In the exemplary embodiment set forth herein six F channels are shown. Consequently, the last F channel, i. e., F6, will have an X signal recorded in it during the sampling time assigned to line 14 of the thrity-fifth revolution as shown in Fig. 8. Then during the time of sampling of line 14 of the succeeding revolution which is the thirty-sixth revolution an X signal is recorded in channel E in the cell thereof assigned to line 14. Upon the next or thirty-seventh sampling interval, an X signal is obtained in the output of the E channel from amplifier 526. As a result of the positive voltage output on the X lead from this amplifier O signals are recorded in the E channel and all of the F channels thus restoring the magnetic condition of the elemental areas assigned to line 14 of these various channels to their initial conditions in the manner described above. In addition, since the output of channel E, which is designated XRE, extends to the right-hand terminal of gate circuit 231, an O is also recorded in channel J at this time by the recording coil 141.

The XRE lead also extends to the combining circuit 611 and to the diode element 621 thereof. The diode 621 is connected to conduct this voltage to lead 614 independently of the voltage applied to the diode 615. Lead 614 extends to the gate circuits of the K channels. At this time the gate circuits of these various channels are connected as described above in such a manner that a signal will be recorded in channel K1 in accordance with the output of channel J. Likewise, a signal will be recorded in each channel of the K sequence of channels in accordance with the signal previously recorded in each of the immediately preceding channels of the sequence. Thus during the thirty-seventh revolution an X signal exists at the output circuit of the amplifier 146 of the J channel and this voltage in combination with the high positive voltage from lead 614 causes an X signal to be recorded in the K1 channel. Likewise, an X signal exists to the output terminals of amplifier 156 of channel K1 and causes an X signal to be recorded in channel K2 by the recording coils 161. The output of amplifier 166 of the K3 has a high positive voltage on its X lead so an X signal is recorded in the K4 channel. At this time the output from channel K2 and the remaining channels K4, K5, etc. will be an O which in combination with the positive voltage from lead 614 causes O signals to be recorded in channels K3 and K5 and in each of the succeeding K channels at this time as shown in the table of Fig. 8.

The high positive voltage on lead XRE is applied to the left-hand terminal of gate 511 and causes an X signal to be recorded in channel D1. This high positive voltage is also applied to the left-hand side of gate 501 and since a high positive voltage is also applied to the left side of this gate from the output of amplifier 516, due to the X signal previously recorded in the D1 channel, an X signal is also recorded in the D2 channel at this time thus indicating that two digits have been dialed over line 14. Lead XRE also extends to one of the conductors of the left-hand terminals of the other gate circuits of the D channels but the other conductors extending to these terminals do not have a positive voltage applied to them at this time since the output from all of the other D channels will be O signals. Consequently, an X is recorded in only channels D1 and D2 at this time.

Thereafter so long as line 14 remains closed the output of channels G1 and G2, H and J will be XXOO, respectively, while the output of channels K1 and K2 will be XX indicating that the last digit is 2 and the output from the channel K3 will be an O signal and the output from the K4 channel will be an X signal and the output from the remaining K channels will be O signals. Likewise, the output from the other counting channels described hereinbefore will also be O signals.

The operation of the various circuits described above is then repeated for each of the digits dialed. At the same time each succeeding digit causes an X signal to be recorded in an additional one of the D channels which channels count the total number of digits received.

It is thus apparent that at the end of any given number of digits the X signals recorded in the cells of the K channels assigned to line 14 will represent the number of pulses received during each digit from line 14. The digits are separated by O signals recorded in the K channels in response to the interdigital spaces which set apart the different digits. It is also apparent that any or all digit values may be recorded for each of the digits including a one for the first digit.

Is is assumed that the last two digits of the dialed number will be 13 with the result that X signals are found in channels G1, G2, J, K1, K2, K4, K6, etc. and O signals are found in channels H, K3, K5, etc. Also X signals are found in all of the F channels and all of the D channels; and O signals in the E, C and all the B channels and the A channel. The reading of the X signal in the F6 channel causes an X signal to be recorded in channel E on the hundredth sampling period assigned to line 14 counting from the starting point as shown in Fig. 8. In other words, an X signal has appeared in each one of the F channels and the E channel subsequent to the last pulse received, thus indicating that the final digit has been completely dialed. At this time an X signal has previously been recorded in channel D7 or the highest number D channel provided. On the next or one-hundred-and-first revolution an X signal appears on the output leads from amplifier 526 which is in the form of a positive voltage on the X output lead and, as described hereinbefore, this voltage causes an O signal to be recorded in all of the F channels as well as the E channel. The X output lead of amplifier 526 is applied to the diode 621 which causes the signals recorded in the K channels to be advanced to one higher numbered K channel as described above, thus at this time an X is recorded in channels K1, K2, K3, and an O is recorded in channel K4, an X in K5, an O in K6 and so forth, thus advancing the recorded number one channel in the K group.

Figures 4, 19:
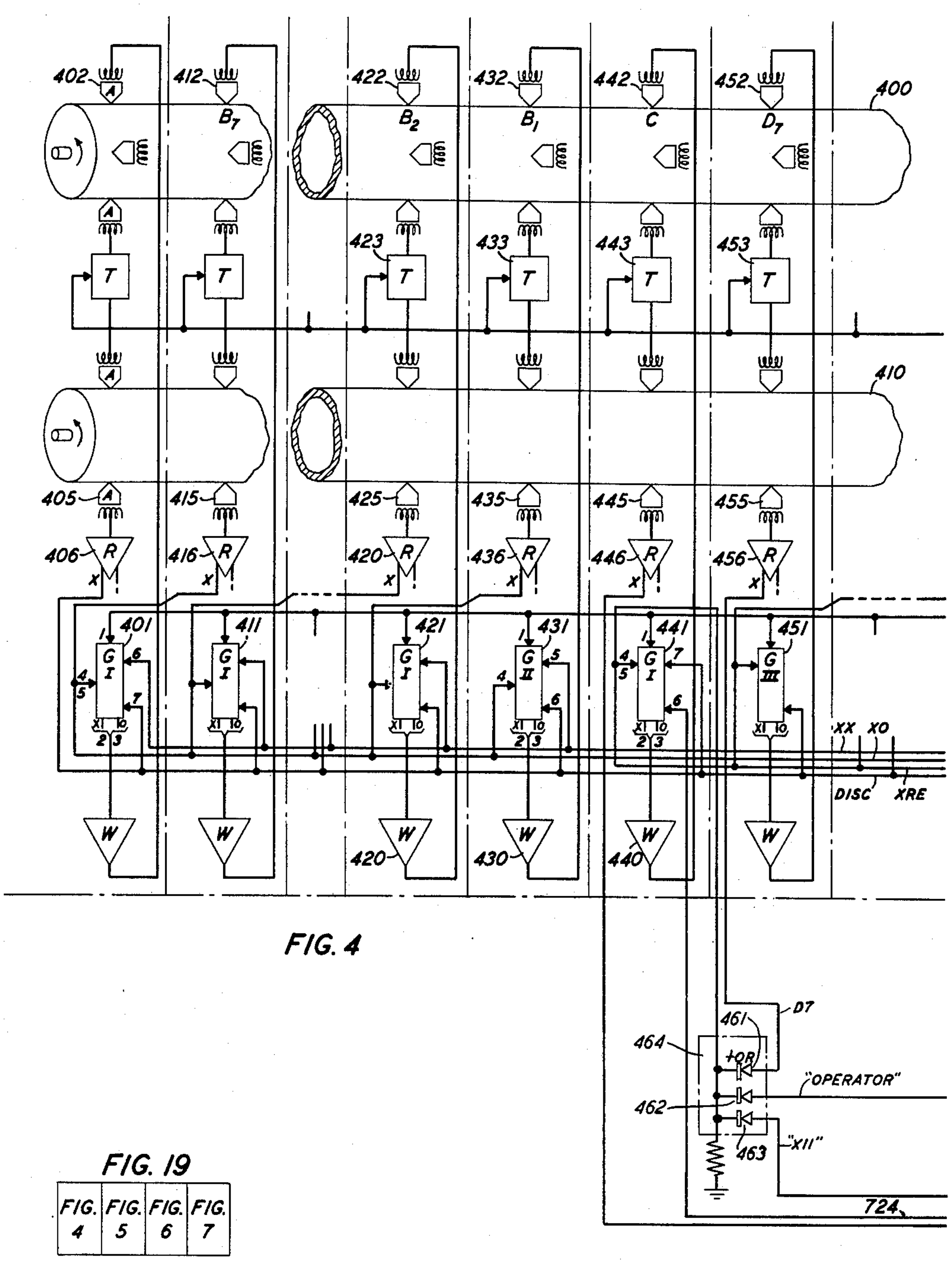
Figure 5:
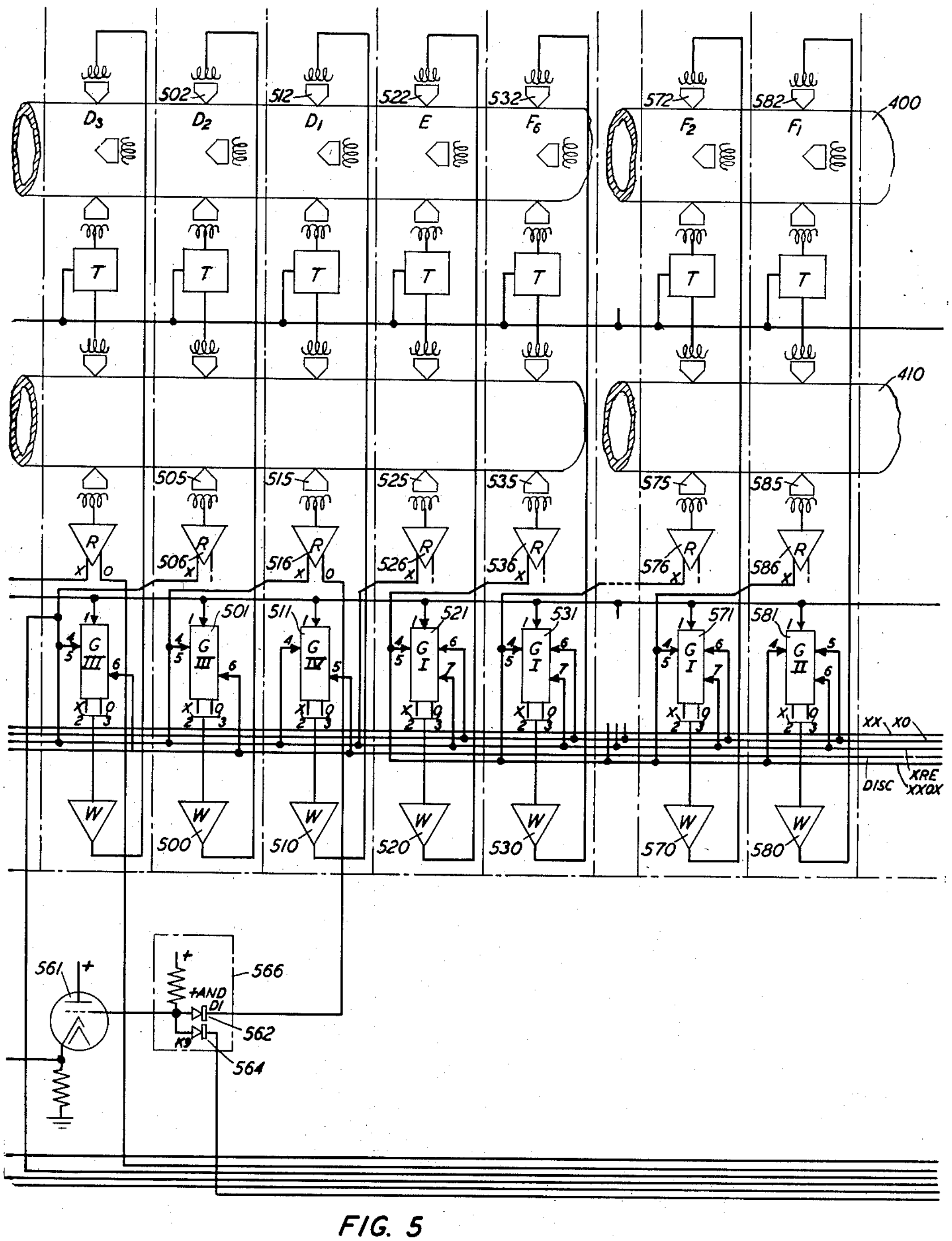
Figure 6:
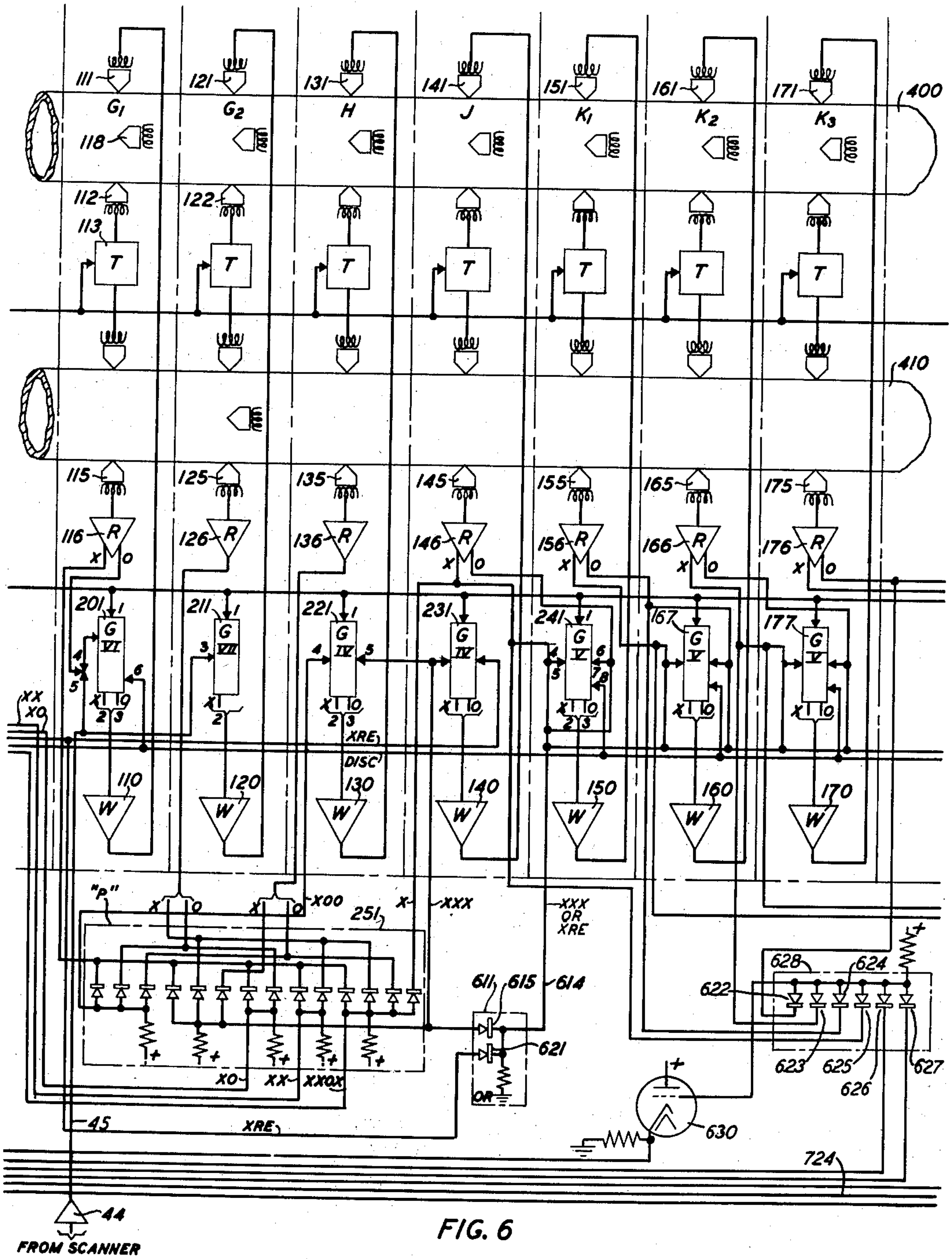

The high positive voltage on the X output lead from amplifier 526 at this time causes an X signal to be recorded in each of the D channels, and since an X signal is already recorded in all of these channels, and more particularly, since an X signal is already recorded in the last one which is D7 as shown in Fig. 4, an X signal is also recorded in channel C. It is to be noted that a high positive voltage from the X output lead from amplifier 456 is transmitted through the diode or rectifier 461 to a left-hand terminal of gate circuit 441. This voltage together with the high positive voltage from the X output lead from amplifier 526 and the synchronizing pulse causes an X signal to be recorded in the cell of channel C assigned to line 14.

The recording of the X in channel C indicates that the dialing or calling signals are completely received and stored and the subsequent voltages produced by the signal recorded in the elemental area of this channel assigned to line 14 is employed to indicate that a complete number has been dialed and awaits further action.

Consequently, on the one-hundred-and-second revolution the output from the various channels during the time assigned to line 14, due to the signals recorded in them, will be as illustrated in the one-hundred-and-second revolution in the table shown in Fig. 8. Under conditions assumed and described hereinafter an O signal is recorded in channel C at this time, as explained hereinafter. These conditions prevail until the call is abandoned or until the circuits function in other manners as described herein.

In the exemplary embodiment of this invention set forth in detail herein, provision has been made to respond to the first digit of any desired value such as zero, which is represented by ten pulses, as a complete call. Such a signal frequency constitutes an operator calling signal in telephone switching systems. While the specific arrangement disclosed herein is directed to recognize a zero and thereafter indicating the reception of a complete designation and displaying such designation, it is to be understood that any other value or identity of the first digit may be similarly recognized if it is so desired.

Prior to the expiration of the interdigital time interval after the first digit, a high positive voltage is applied to the O output lead of the amplifier 516 of the D1 channel because O signals are recorded in the cells assigned to line 14 of all of the D channels at this time. This high positive output voltage is applied to the diode 562 of the combining circuit 566. If the first digit dialed is 0 which is represented by ten pulses, then at this time prior to the expiration of the interdigital time interval an X signal is recorded in the J channel and each one of the first nine K channels, K1 through K9 with the result that a high positive voltage is also applied to diode 564 of the combining circuit 566. It is thus apparent that high positive voltage will be applied to both of the input terminals of the combining circuit 566 only before the termination of the interdigital pause after the first digit and only if an X signal has been recorded in the K9 channel. These two conditions prevail only in response to the zero dialed for the first digit. Under these circumstances with a high positive voltage on both the input leads of the combining circuit 566 a high positive voltage is repeated to its output circuit and applied to the control element of tube 561. Output lead from tube 561, which is connected to the cathode resistor of this tube extends to the diode 462 of combining circuit 464. The diodes of the combining circuit 464 are connected in such a direction that it will repeat a high positive voltage to the output circuit when a high positive voltage is applied to any of its leads independently of whether or not the high positive voltage is similarly applied to any of the other of its input leads. Consequently, the high positive voltage repeated by tube 561 is transmitted through the diode 462 to the output lead of the combining circuit 464 which lead extends to one of the left-hand input terminals of the gate circuit 441 of the C channel. Inasmuch as a high positive voltage is applied to the XRE lead at the termination of the interdigital time interval as described above, an X signal is recorded in the C channel at this time and on the subsequent revolution this X signal constitutes a signal to the display apparatus indicating the completion of the registration of the call. The circuits then operate as will be described hereinafter in the same manner as if all eight digits had been dialed and recorded in the manner described above.

From the description herein it is apparent that the registering and storing mechanism recognizes as a complete call or as a complete calling station designation either a single digit or eight digits which is the maximum number of digits which can be accepted in the specific embodiment described herein.

Also when desired other values of the first digit may be employed instead of a count of ten, if, a zero, by connecting the input of the combining circuit to the proper K channel, in a manner similar to that described above.

Provision is also made to accept and recognize as a complete call or as a complete designation of a destination of a call an intermediate number of digits. In the specific embodiment set forth herein circuits have been arranged so that they will respond to predetermined combinations of three digits and display such three digits independently of whether or not additional digits are dialed.

In order to recognize and respond to such digits which it is assumed take the form of X11 where X may have any magnitude or identity and the succeeding digits are both one. It is to be understood of course that other suitable forms of the three digits may be equally well recognized if desired.

Inasmuch as it is assumed that it is desired to recognize three digits, the diode 626 of the combining circuit 621 is connected to the O output lead of reading amplifier of the D3 channel. This lead therefore has a high positive voltage upon it prior to the termination of the interdigital interval after the completion of dialing of the third digit. Rectifier 627 is connected to the X output of the reading amplifier of the D2 channel. This lead therefore has a positive high voltage impressed upon it only if two or more digits have been dialed. These two leads will therefore have a high positive voltage impressed upon them only after the second digit is dialed and before termination of the interdigital time interval after the third digit. If each of the last two digits is a one then the J and K2 channels will have X's recorded in them and the K1 and K3 channels will have O signals recorded in them after the dialing of the second one. Consequently, if the last two digits are each "one" a high positive voltage is impressed upon the X output leads from the reading amplifiers of J and K2 channels, namely, amplifiers 146 and 166. These output leads extend to the respective rectifiers of diodes 625 and 623 of the combining circuit 621. In addition, the O output leads of the K1 channel and K3 channel, namely, the amplifiers 156 and 176 will have a high positive voltage applied to them by these amplifiers. These leads extend to the respective diodes 624 and 622 of the combining circuit 621. Thus, in response to the conditions assumed a high positive voltage is applied to all of the input leads to the combining circuit 628. This combining circuit has the rectifiers or diodes so arranged that a high positive voltage is repeated to its output circuit or lead only if a high positive voltage is applied to all of the input conductors. The dialing of a code having a form of X11 is the only code or set of codes which will apply a high positive voltage to all of the input leads of this combining circuit and thus the only form of code or codes which will cause a positive voltage to be applied to the control element of tube 630. The high positive voltage thus applied to the control element of tube 630 is repeated in its output or cathode circuit and applied to the diode 463 of the combining circuit 464. This high positive voltage is transmitted through the diode 463 independently of the voltage applied to the other input leads of the combining circuit 464 and applied to the left-hand input of the gate circuit 441. Then at the end of the interdigital interval a high positive voltage is applied to the XRE lead in the manner described hereinbefore so a high positive voltage is applied to the other left-hand input to gate circuit 441 thus causing an X signal to be recorded in the C channel which X signal is employed to thereafter control the display of the called or dialed number as well as the identity of the line over which this number was dialed as will be described hereinafter.

Also when desired other types of codes such as X23 or XX13, etc. may be recognized in a similar manner by connecting inputs to a combining circuit to the proper outputs from the J, K and D channels.

If at any time during the above-described operations, or in the subsequent described operations, it is desirable to abandon or terminate a call, the switch 10 is opened thus interrupting the current flowing over line 14 at which time X signals are not recorded in channel G2 with the result that the output from channels G1 and G2 are X and O respectively. Consequently, a high positive voltage appears on the XO lead as described above and as assumed at the two-hundred-and-first sample, as shown in tables of Fig. 8, an X signal is recorded in channel B1. During sampling period of line 14 during the next revolution of the drum during which the line remains open, an X signal is recorded in both channels B1 and B2. Likewise, during the time assigned to line 14 of the two-hundred-and-third revolution an X signal will be recorded in each of the channels B1, B2 and B3 in the manner described hereinbefore. If during the sampling interval of line 14 of any revolution of the drum and the corresponding scanning of the target of the scanning tube assigned to line 14 the line should be closed, then during sampling times of line 14 of the subsequent revolution of the drum a high positive voltage is applied to the XX lead, which voltage immediately causes O signals to be recorded in all of the B channels with the result that the count must start over again when the line again becomes open. If the line remains open sufficiently long, an X signal will be recorded in all of the B channels. The number of B channels provided is determined by the time required to distinguish or recognize a disconnect signal. Upon the next sampling period of line 14 after the X signal is recorded in the last B channel, assumed to be during revolution number two-hundred-and-twenty-one in Fig. 8, an X signal is recorded in the A channel and upon the next revolution of the drum 410, O signals are written in all of the channels A, B1 through BN, C, D1 through D7 in the unit areas assigned to line 14. O signals have previously been written in channels E and F1 through F6, inclusive. An O signal is also written in channel G1 and an O signal is already present in output from channel G2 as described above. O signals have already been recorded in channels H and J at the termination of the last recorded digit in the manner described above, and O signals are recorded in all of the K channels thus completely restoring the elemental areas of the drum assigned to line 14 to their initial condition indicating an idle condition of this line.

Returning now to the indication that a complete number has been dialed comprising an X signal recorded in the elemental area of channel C assigned to line 14, in any of the manners described above, a group of circuits shown in the lower portion of Fig. 7 are provided to indicate both the identity of the calling line 14 and also the number dialed by that line.

This equipment comprises first, a counter designated 750 which is arranged to count the synchronizing pulses from drum 410 during each revolution thereof. In addition, a reset pulse per revolution is employed to reset the counter to an initial or zero position once during each revolution of the drum. This equipment comprises, in part, a single toothed gear 102 shown in Fig. 1, mounted on the drum shaft and rotated therewith. Thus the count existing in the counter 750 at any instant of time indicates the identity of the line being scanned by the electron beam of tube 25 at that time. This count may be identified by any suitable number of binary digits or denominal positions or other form of identification including the listing or directory number of calling line when desired. However, it is not essential that the identifying number counted by the counter indicate such directory or listing number. Instead, it may merely serve to identify each line by a particular assigned number. As shown in the exemplary embodiment set forth herein, it is assumed that each line is identified by a binary number indicating the number of pulses from the reference pulse which must be counted by the counter until the elemental areas assigned to that line simultaneously pass under the recording coils shown on the top of Figs. 4, 5, 6 and 7 and also under the pick-up coils shown in the middle of these figures and designated 405, 415, 425, 435, 445, 455 and so forth in the other Figs. 5, 6 and 7.

If it is assumed that the monostable multivibrator 1050 has been reset in the manner described herein, and that the registers 744 and 745 do not have a number displayed on them but rather have been returned to normal in the manner described herein, when the X recorded in the elemental area of channel C assigned to line 14 passes under the pick-up coil 445, a positive voltage is applied to the diode 760 in combining circuit 741. The multivibrator 1050 as assumed above is reset, a high positive voltage is also applied to the diode 762. Likewise, if the register circuits 744 and 745 are properly conditioned to record or display a number and are not at that time so displaying a number, positive voltage is also applied to diode 761 and thus to each of the diodes of the combining circuit 741, which repeats this positive voltage to its output circuit which extends via lead 724 to the gate circuits 731, 732, 733, 734, 735, 740, 751, 752, etc., and also to the right-hand terminal of the gate circuits 441 of channel C. The application of positive voltage to the right-hand terminal of this gate circuit causes an O signal to be recorded in channel C at this time as indicated during revolution one-hundred-and-two of Fig. 8. Consequently, during the next and subsequent revolutions of the drum, a positive voltage does not appear on the X output lead from the amplifier 446 of channel C. Consequently, no further indications are given in elemental area assigned to line 14 that a number had been completely recorded and is awaiting further operation of the circuits. The application of a positive voltage to lead 724 and to the gate circuits 731 through 752, as described above, causes the register circuit 744 to be set in accordance with the signals from the K channels associated with line 14 and causes the register circuit 745 to be set in accordance with the binary number designating line 14. Thereafter, the high positive voltage is removed from diode 761 thus preventing the use of these register circuits for storing, holding, or displaying other numbers. Likewise, the number continues to be displayed in this register until key 1051 is operated which operates the monostable multivibrator 1050.

As shown in Fig. 7 leads extend from the register circuits 744 and 745 and from multivibrator circuit 1050 to common control equipment. These leads are optional and may be provided when desired and may extend to any desired type or types of common control equipment.

Multivibrator 1050 in operating in response to the operation of key 1051 removes the positive voltage from the diode 762 thus preventing use of the register circuits 744 and 745 during the time they are being reset by the multivibrator due to the positive voltage from the multivibrator 1050 which is applied to the right-hand gate terminals of the gate circuits 731 through 740 and 751 and 752, etc., which voltage causes the register circuits to be restored to their normal condition.

Thereafter when multivibrator 1050 is again restored to its normal or idle condition the register circuits will be in condition to record the identity of another line and the number dialed over that line. The operation of the register circuits 744 and 745, as well as counter 750, and the gate circuits 731 through 740 and 751, 752 and so forth, may be more fully understood by reference to Figs. 9 and 10 which show in detail circuits forming the exemplary embodiment of the various counting register and gate circuits shown in Fig. 7.

Fig. 9 also shows in greater detail the amplifiers associated with the timing wheels 101, 102 which are mounted on shaft 100. The output from the pick-up coil 50 associated with the timing wheel 101 is amplified and limited by both sections of tube 970 so that substantially a square wave form is applied to the left-hand section of tube 971. This section of tube 971 is normally biased so that substantially no current flows in its anode-cathode circuit. However, when the output of the right-hand section of tube 970 is positive current will flow through the left-hand section of tube 971 and through the coupling coil 972 of the normally blocked or quiescent blocking oscillator comprising the right-hand section of tube 971. As a result a pulse current flows in the anode-cathode circuits of the right-hand section of tube 971 with the result that the cathode of this section becomes positive and transmits a positive pulse of short duration over lead 973. These pulses are repeated in response to each input pulse and are applied to the various circuits shown in the other figures of the drawing for controlling the recording of signals in the drum in a manner described hereinbefore.

Figure 10:
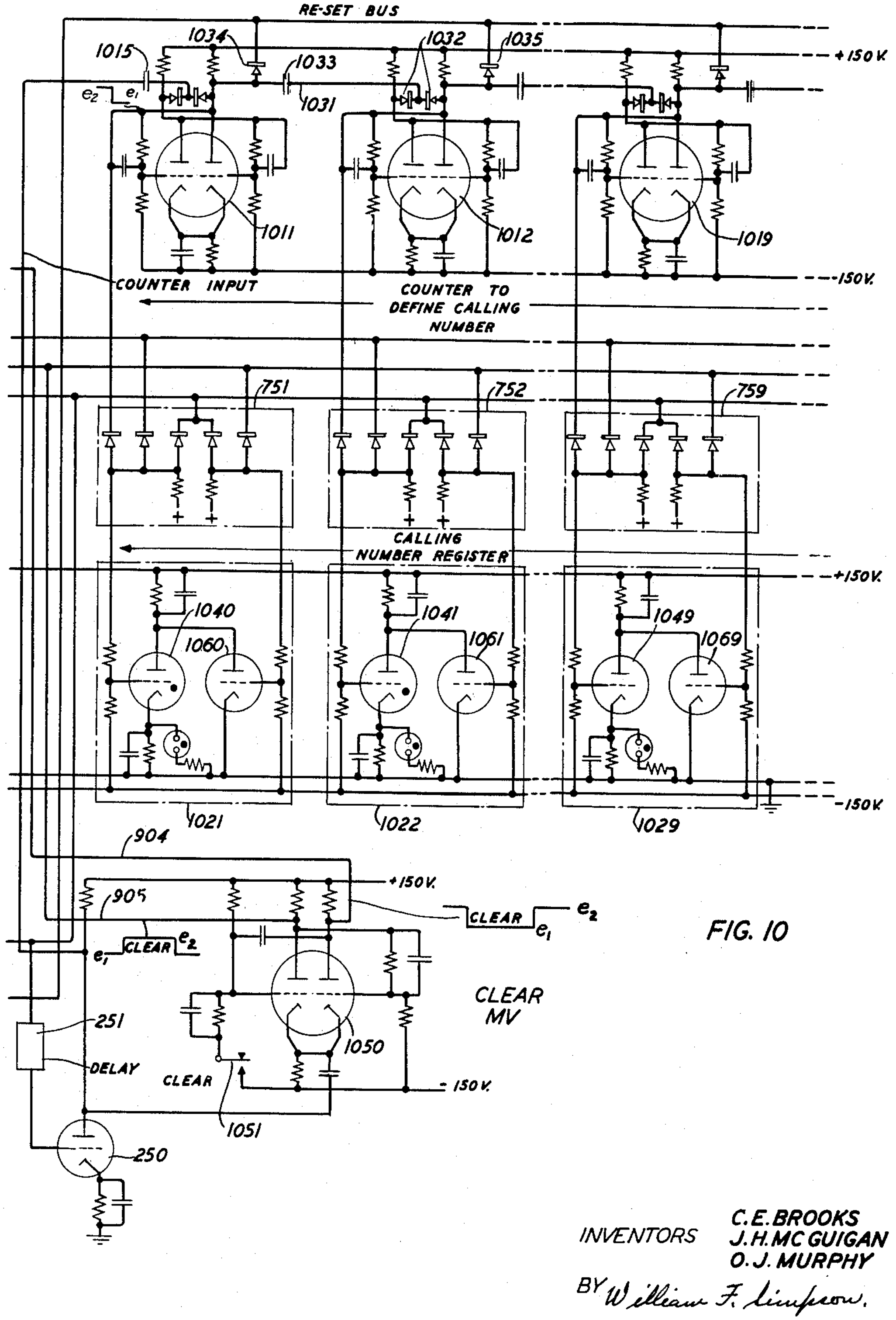

These positive pulses from lead 973 are also connected through the delay line 251 to the input of the phase inverting repeating tube 250. The delayed negative going pulses output from this tube are applied to the input circuit of a counter circuit represented by the three tubes 1011, 1012 and 1019. Each of these tubes comprises a binary counting stage which is normally arranged to have the right-hand section conducting when the counter is set in a zero position or condition. These tubes are initially set in this condition in a manner described hereinafter. While only a first, second and intermediate or last tube of such a counter is shown in Fig. 10, it is to be understood that one tube similar to tubes 1011, 1012 and 1019 is provided for each counter stage and that so many counter stages are provided as are required to count the number of calling lines associated with a magnetic drum. That is, a sufficient number of counter stages will be provided to count the number of total cells in each of the individual channels on the drum.

As the drum rotates the timing wheel 101 induces voltage in the pick-up coil 50 which voltage is in turn relayed by both sections of tube 970 which applies a positive pulse or portion of a square wave to tube 971 for each of the cells or unit areas of the respective channels of the drum. Thus a positive pulse is generated by the blocking oscillator tube for each of the lines connected to the cathode-ray tube which controls the recording of the signals in the magnetic drum. These positive pulses are delayed, inverted and then in turn counted by the counter tubes 1011, 1012, 1019, etc.

Briefly, as pointed out herein the timing or synchronizing pulses applied to lead 973 are positive pulses. The positive timing or synchronizing pulses are transmitted from lead 973 through the delay line 251 and repeated by the phase inverting tube 250 as negative going pulses. In turn the negative going pulses from tube 250 are transmitted through the coupling condenser 1015 to the diodes connected to the anodes of tube 1011 and thus to the grids of these tubes through the cross-coupling networks. Each pulse then causes the conduction within sections of the various counting tubes to transfer to the other section of the respective tubes.

If it is assumed that the right-hand section of tube 1011 is conducting, then the diode connected to the left-hand section will have a relatively lower resistance or impedance to the applied negative pulse than will the diode connected to the right-hand plate because the voltage of the anode of the conducting right-hand section is much lower or more negative than the voltage applied to the anode of the left-hand section when the left-hand section is cut off. Consequently, substantially all of the applied negative pulse is transmitted to the anode of the left-hand section and then to the control grid of the right-hand section where it causes the current flowing through the right-hand section to be interrupted. As a consequence, the flow of current through the left-hand section is initiated in the usual manner with the result that the conduction within the tube 1011 is transferred from the right-hand section to the left-hand section.

When the current flowing through the right-hand section is, as described above, interrupted the anode of this section becomes more positive and applies a more positive pulse through condenser 1033 and over lead 1031 to the coupling diodes or rectifiers 1032. These diodes or rectifiers are connected so as to prevent the transmission of this positive voltage to tube 1012.

Upon the application of the next positive voltage pulse from the tube 971 over lead 973, delay line 251, and repeating tube 250, current flowing through the left-hand section of tube 1011 will be interrupted and a flow of current through the right-hand section initiated in a manner similar to the manner in which the current was transferred to the opposite direction upon the application of the first delayed and inverted pulse from lead 973 to this tube as described above. As a result the voltage of the anode of the right-hand section falls to a relatively low voltage which in turn causes a negative pulse to be applied through the condenser 1033 to the diodes 1032. The condenser 1033 together with the magnitudes of the resistors and impedance devices connected in circuit therewith is such that the negative pulse is of relatively short duration. This pulse is of a proper polarity to be transmitted through the diodes 1032. However since the right-hand section of tube 1012 is conducting current its anode is at a lower positive voltage than the anode of the left-hand section. As a result the left-hand diode 1032 offers less impedance than the right-hand diode and this pulse is applied through the left-hand diode 1032 to the left-hand anode of tube 1012 and then to the control grid of the right-hand section of tube 1012 which negative pulse tends to interrupt the current flowing through this secton of tube 1012 and initiates flow of current through the left-hand section of tube 1012. Thus with tube 1011 in its initial condition and the left-hand section of tube 1012 conducting a count of two is recorded by the binary counter. In the above-described manner each succeeding delayed and inverted pulse from lead 973 is counted by the binary counter in the usual manner.

Inasmuch as a pulse is applied to lead 973 for each of the cells or slots around the magnetic drum, each line associated with the drum may be represented or designated by a different count of the binary counter comprising tubes 1011, 1012, 1019, etc.

The output from the single tooth timing wheel 102 also mounted on shaft 100 is amplified and shaped by tube 980 with the result that a substantially square pulse is applied to the control grid of the left-hand section of tube 981. This tube, like tube 971, has its left-hand section normally non-conducting but conducts a pulse of current in response to each of the positive pulses applied to its control grid. These positive pulses flow through the coupling coil 982 of the blocking oscillator which includes the right-hand section of tube 981, and causes an output pulse which is in a negative direction, or of lower positive voltage, to be applied to the conductor 983 extending to the counter tubes 1011, 1012 and 1019. As a result after each revolution of the drum a pulse of a negative-going character is applied to the lead 983. This lead is coupled to the anodes of the right-hand sections of tubes 1011, 1012, 1019, etc., through a coupling diode or rectifiers 1034, 1035, etc.

The rectifiers 1034 and 1035 are poled or connected in such a manner that so long as the right-hand section of tube 981 is not conducting current so that its anode is at the same or a relatively higher potential than the anodes of the right-hand sections of tubes 1011, 1012 and 1019, substantially no current flows through these rectifiers 1034, 1035, etc. However, if any of the left-hand sections of tubes 1011, 1012, 1019, etc., are conducting current and as a result the right-hand sections of these tubes are not conducting current when a negative pulse is applied to the conductor 983, this negative pulse is transmitted through the respective diodes 1034, 1035, etc., to the grids of the left-hand sections of the corresponding tubes and causes the interruption of current flowing through these sections which then restores the flow of current to the right-hand section of these tubes. Such an action normally tends to change the conducting condition of the immediately succeeding counter stage. However, by properly selecting the circuit constants and by properly controlling the duration and otherwise shaping the negative pulse applied to lead 983 this negative pulse is made sufficiently long to prevent the initiation of a transfer of current in a succeeding counter stage with the result that when the negative pulse from lead 983 terminates or falls below a predetermined magnitude, that is, the anode of the right-hand section of tube 981 rises above a predetermined positive voltage, all of the counter stages of Fig. 10 have been restored to their original or initial condition indicating a count of zero. Thereafter the next delayed and inverted timing pulse causes the counter to start over and again count each of these pulses. As a result, the count on the counter for each revolution identifies each of the lines common to the magnetic drum and cathode-ray tube scanning arrangement.

As described hereinbefore, when complete calling signal information has been received and recorded in a magnetic drum an X signal is recorded in the cell or unit area of channel C assigned to the respective line. The pick-up coil 425 and amplifier 426 of channel C are shown for convenience in Fig. 9. The X output lead from amplifier 426 is connected to the first diode of the gate circuit 741. During timing interval assigned to line 14 of the next revolution of the drum the X signal causes a high positive voltage to be applied to the X signal output lead from this channel C which positive voltage is, in turn, applied to the gate circuit 741. Assuming for purposes of illustration that the register is idle and that the restoring multivibrator comprising tube 1050 is in its normal condition with current flowing through the left-hand section of this tube so that the anode of the right-hand sections is at a substantially maximum positive voltage which causes positive voltage to be applied over conductor 904 to the second diode of the gate circuit 741. If it is further assumed that the register tubes such as 910, 920, 930, 1040, 1041, 1049, etc., are all idle then the anode of the tube 910 will also be at its substantially maximum positive voltage. Consequently, the grid of tube 911 will also become more positive and repeats a high positive voltage to the cathode of this tube, which tube acts as a cathode follower and repeats the voltage condition of its grid.

In this case, the cathode follower tube or other suitable relay or repeater tube is connected to the output of the combining circuit which repeats the output voltage from this circuit to a large plurality of other gate circuits. In this case as well as in the case of any of the other gate circuits described herein, such a repeating or amplifying tube may be included in the output circuit where desired or necessary due to the large number of diodes connected to this output circuit. Such repeating tubes have not been shown in all of the other output circuits merely to simplify the drawing and aid and facilitate the understanding of the exemplary embodiment of this function set forth herein. It is to be understood, however, that such tubes are provided in any or all of the gate or combining circuits as may be required.

The output of tube 911 is applied to the gate circuit 441 of channel C as described hereinbefore and causes an O signal to be recorded in the elemental area of channel C assigned to line 14, for example, with the result that upon the next revolution of the drum a high positive pulse is not applied to the X output of amplifier 446 in response to the unit area of this channel assigned to line 14.

However, the positive pulse from the amplifier 446 as described above is repeated by tube 911 and applied to one of the left-hand input circuits of the gate circuits 731, 732, 740, etc. as shown in Fig. 9 as well as Fig. 7, and also to the corresponding rectifiers of the gate circuits 751, 752, 759, etc., of the gate circuits shown in Figs. 10 and 7. As a result, the gate circuits and only those gate circuits of those K channels which have X signals recorded in the cells or unit areas assigned to line 14, and thus have a high positive voltage on their output X leads from the corresponding output amplifiers, will have a high positive voltage applied to their output circuits upon the application of the synchronizing pulse from lead 973 individual to line 14. Consequently, a high positive voltage is applied to the control grids of tubes 910, 920, 930, etc., individual to the various K channels which have X signals recorded in the cells individual to line 14.

These tubes 910, 920, 930, etc., are gas-filled tubes and once a flow of current through these tubes is initiated the current continues to flow until interrupted in a manner described hereinafter. Current flowing through tube 910 reduces the anode voltage of this tube so that the voltage applied to the right-hand diode of the gate circuit 741 is no longer sufficiently positive to allow the former value of positive voltage to be applied to the output lead of tube 911. Consequently, no further signals can be recorded in the register circuits at this time even though other X signals are recorded in other cells of channel C which will cause a positive voltage on X output of amplifier 426 which is applied to the left-hand diode of gate circuit 741. Furthermore, no further signals are recorded in the register circuits shown in Figs. 7, 9 and 10 even though the various K channels provide X signals derived from other cells of said K channels corresponding to other calling lines. In addition, when a discharge flows through any tube such as tubes 910, 920, 930, etc., the cathode of these tubes becomes sufficiently positive to initiate a discharge in the indicating tubes 912, 922, 932, etc. As a result the tubes 912, 922 and 932 become lighted in response to the X signals but not in response to O signals recorded in the corresponding K channels thus clearly indicating the number dialed by the attendant at the calling station. Likewise, the positive voltage from the output of tube 911 causes positive voltages to be applied to the output circuits from the gate circuits 751, 752, 759, etc., individual to those stages of the binary counter which are in their off-normal condition indicating a digit of 1, but not to those gate circuits 751, 752, 759, etc. individual to binary counter stages which are in their initial condition indicating a zero. These voltages cause discharges through the corresponding discharge tubes 1040, 1041, 1049, etc., which discharges in turn cause discharge through the associated indicating tubes. Consequently, the signals recorded in the K channels as well as the identity of the line over which these signals were received are transferred to the indicating tubes associated with each of the gas tubes of the register circuit. Thereafter, the register circuit remains in the condition indicated until the attendant or operator notes the number or designation dialed and also the identity of the line over which a number was dialed. At this time the attendant may restore the register circuits to its initial condition by momentarily operating key 1051.

When the common control equipment indicated in Fig. 7 is provided this equipment may be arranged to automatically intiate the operation of the reset monostable multivibrator 1050 in which case the operation and restoration of the display and register circuits becomes automatic.

The operation of key 1051 applies a more negative voltage to the control grid of the left-hand section of tube 1050 thus interrupting the current flowing through this section and initiating the flow of current through the right-hand section of the multivibrator tube 1050. As a result the voltage applied to the lead 904 becomes more negative so that during the time the multivibrator 1050 is in its off-normal condition, that is, during the time current flows through the right-hand section, other pulses from the output of channel C will be unable to actuate any of the register circuits. In addition, the interruption of current through the left-hand section of tube 1050 causes its anode to become more positive and thus apply more positive voltage to conductor 905 which extends to the right-hand sides of each of the gate circuits 731, 732, 740, etc., and each of the gate circuits 751, 752, 759, etc. Consequently, during each of the succeeding synchronizing pulses applied to lead 973 a positive pulse is transmitted through the right-hand side of these gate circuits and applied to the control grids of tubes 900, 921, 931, etc., and the corresponding tubes of the register circuits 1020, 1021, 1029, etc. As a result, tube 900, for example, conducts current and reduces the anode voltage of tube 910 to a value such that the anode-cathode voltage is less than the sustaining voltage of this gas tube since the voltage of the cathode of this tube is maintained by the cathode condenser at a relative high positive voltage resulting from the discharge current flowing through the cathode resistor, thus interrupting the discharge current through this tube and thus extinguishing this tube and also the indicator tube 912. In a similar manner discharges through the other tubes 920, 930, 1040, 1041, 1049, etc., are interrupted with the result that the register and indicating tubes are all restored to their initial or normal condition. When tube 910 is restored, its anode voltage will rise to a more positive value and thus apply a positive voltage to the right-hand diode of the gate 741 thus indicating that the register circuit is idle. It should be noted that tube 910 is associated with channel K1 and that this channel will always have a final pulse in it, independently of the number dialed so that so long as a number is recorded in the register the anode of tube 910 will be at a reduced voltage thus preventing the recording of any other number in the register circuit. However, upon the restoration of tube 910 to its normal condition, the voltage of its anode rises to a high positive value thus indicating that the register is idle and free to accept some other dialed number and line identification. So long as the monostable multivibrator 1050 is in its reset position the voltage applied to the middle diode of the gate 741 is at a relatively low value which prevents the operation of the combining circuit and thus prevents the registering of additional numbers in the register circuit. After the register, counter, tubes and circuits have had sufficient time to become reset the grid of the left-hand section of tube 1050 again becomes positive causing this section to start to conduct current and interrupt the current flowing through the right-hand section of this tube. Consequently, the voltage of its anode rises to its most positive value thereupon conditioning the gate circuit 741 for accepting other pulses and causing the registration of other dialed numbers. The restoration of tube 1050 to its idle condition again applies a relatively low voltage to lead 905 so that no further pulses are transmitted to the restoring leads 910, 921, 931, etc. Thereafter, when the next positive pulse is applied to the output lead of amplifier 426 an additional number is registered in the registered circuits which circuits will then again indicate both the number dialed and the line over which the number was dialed in the manner described hereinbefore.

It is to be understood that relays or other indicating devices instead of tubes 910, 920, 930, etc., may be used in place of or in addition to the tubes 921, 922, 932, etc., as described herein to control lamps or other circuits as may be desired.

What is claimed is:

1. In a calling system in combination, a calling line including an electrical circuit path, dial pulse transmitting device individual thereto, a continuously moving surface of magnetic material, a recording device located adjacent said surface, interconnections between said recording device and said line for changing the magnetic condition of a small element of said surface in response to the completion of said electrical circuit path followed by an interruption of said electrical circuit path which in turn is followed by a subsequent completion of said electrical circuit path, apparatus for counting the number of interruptions of said electrical circuit path followed by subsequent completions thereof, and a recording circuit controlled by the operation of said counter in counting a predetermined number of said sequences of interruptions followed by subsequent completions of said electrical circuit path to record a still further signal in said surface.

2. In a telephone switching system, a magnetic recorder for recording dial pulses comprising the surface of continuously moving magnetic material, a first recording device located adjacent said surface, a second recording device also located adjacent said surface, a first pick-up device located adjacent said surface for responding to a magnetic condition of said surface produced by said first recording device, a second pick-up device for responding to the magnetic condition of said surface produced by said second recording device, apparatus for receiving dial pulses, means including interconnecting circuits between said apparatus for receiving dial pulses and said first recording device for changing the magnetic condition of said surface in accordance with received dial pulses, and a signal receiving circuit controlled by a predetermined number of dial pulses recorded by said first recording device for changing the magnetic condition of said surface under said second recording device and means controlled by signals induced in said pick-up devices for utilizing said signals.

3. In a calling arrangement, a call signal receiving and recording device comprising in combination signal receiving means responsive to signals of one or the other of two different characters, magnetic recording means including a magnetizable surface, apparatus for changing the magnetic condition of a portion of said magnetic surface to indicate the end of said signals, apparatus responsive to a predetermined number of series of said signals for actuating said magnetic recording means for changing the magnetic condition of a portion of said magnetic surface to indicate the end of signaling, and a control circuit responsive to a predetermined number of said signals for changing the magnetic condition of a portion of said magnetic surface to indicate the end of signaling.

4. In a calling arrangement, a call signal receiving and recording device comprising in combination signal receiving means responsive to signals of one or the other of two different characters, a continuously moving magnetic surface, apparatus for recording an additional signal in said magnetic surface indicating the end of said signals, apparatus responsive to a predetermined number of series of said signals for actuating said apparatus for recording said additional signal indicating the end of signaling, and pulse responsive circuits responsive to codes of a predetermined lesser number of series of said signals for actuating said recording apparatus to record a termination of signaling.

5. In a calling arrangement a calling line, a dial for transmitting a series of pulses over said line representing each digit of a calling signal, recording apparatus comprising a continuously moving surface of magnetic material having permanent magnet properties, recording devices adjacent said surface, control circuits including connections between said line and at least one of said recording devices including means for changing the magnetic condition of said surface under control of signals transmitted over said line by said dial, and control circuits whereby a predetermined number of successive pulses initiate the recording of an additional signal in said surface by at least one of said recording devices.

6. In a dial pulse register in combination, apparatus for receiving dial pulses, a continuously moving surface of magnetic material, a recording device located adjacent said surface to change the magnetic condition of small areas of said surface under control of said apparatus for receiving dial pulses, and a recording circuit responsive to a single digit of predetermined character represented by dial pulses for changing the magnetic condition of a small element of said surface to indicate the termination of signaling.

7. In a dial pulse register a continuously moving surface of magnetic material having permanent magnet properties, a recording device located adjacent said surface, a calling line connected to said recording device, a dial for transmitting signals over said line, means for recording signals transmitted over said line by changing the magnetic conditions of portions of said surface and a signal receiving circuit controlled by a plurality of consecutive dialed digits each of a predetermined character for changing the magnetic condition of a small portion of said magnetic surface.

8. In a dial pulse register a continuously moving surface of magnetic material having permanent magnet properties, a recording device located adjacent said surface, a calling line, interconnections between said recording device and said line, means for changing the magnetic condition of a small area of said surface in response to the closure of said line, and a control circuit for changing the magnetic condition of a small area of said surface in response to a single series of a predeterminel number of subsequent openings followed by reclosures of said line.

9. In a calling arrangement in combination, a plurality of calling lines, a magnetic recorder for recording calling signals of one or the other of two different characters, signal receiving means, apparatus for operatively interconnecting said signal receiving means with each of said lines in succession, magnetic storing means comprising a continuously moving magnetic surface and a plurality of recording and pick-up devices located adjacent said surface, control circuits including interconnections between said signal receiving means and said recording and pick-up devices for recording in said magnetic surface in predetermined elemental areas thereof calling signals from each of said lines, other apparatus for recording an additional signal individual to each of said lines in said magnetic surface indicating the end of calling signals received from each of said lines, and a control circuit connected to said pickup devices whereby a predetermined number of signals received from any of said lines actuates said apparatus for recording said additional signal indicating the end of signaling from that line.

10. In a calling arrangement in combination, a plurality of calling lines, signal receiving means, apparatus for operatively interconnecting said signal responsive means with each of said lines in succession, magnetic storing means for recording calling signals of one or the other of two different characters, comprising a continuously moving magnetic surface and a plurality of recording and pick-up devices located adjacent said surface, control circuits including interconnections between said signal receiving means and said recording and pick-up devices for recording in said magnetic surface in predetermined elemental areas thereof calling signals from each of said lines, other apparatus for recording an additional signal individual to each of said lines in said magnetic surface indicating the end of said signals, control means whereby a predetermined number of said series of signals from any of said lines actuates said apparatus for recording said additional signal indicating the end of signaling, and a recording circuit controlled by predetermined codes of a lesser number of series of said signals from any of said lines for actuating said recording apparatus to record the termination of signaling from the respective lines.

11. In a calling arrangement in combination, call signal receiving apparatus for receiving signals of one or the other of two different characters, signal recording means including a continuously moving magnetizable surface and magnetic recording and pickup devices located adjacent said surface, means for recording a signal in said magnetic surface indicating the end of call signals, means whereby a predetermined number of series of said signals initiate in the recording of said additional signal, and a signal receiving circuit connected to said pickup devices whereby predetermined recorded codes of lesser numbers of series of said signals actuate said recording apparatus to record a termination of signaling.

12. In a calling arrangement in combination, a call receiving and recording device comprising in combination signal receiving means for receiving signals of either one or the other of two different characters, magnetic recording means including a magnetizable surface, apparatus for changing the magnetic condition of a portion of said magnetic surface to indicate the end of signals, means connected to said call receiving and recording device whereby a predetermined number of said signals initiates the operation of said magnetic recording means for changing the magnetic condition of said portion of said magnetic surface to indicate the end of signaling and other means also connected to said signal receiving and recording devices whereby predetermined patterns of said signals actuate said recording device to change the magnetic condition of said portion of said magnetic surface to indicate the end of signaling.

13. In a dial pulse register in combination, a continuously moving surface of magnetizable material having permanent magnetic properties, a recording device located adjacent said surface, a calling line including an electrical transmission path, interconnection means between said recording device and said line, means for changing the magnetic condition of a small area of said surface under control of the completion of said path, and a recording circuit including one of said recording devices for changing the magnetic condition of a small area of said surface solely under control of a single sequence of a predetermined number of subsequent openings interruptions followed by subsequent completions of said path.

14. In a dial pulse register in combination, a continuously moving surface of magnetic material having permanent magnetic properties, a plurality of recording devices located adjacent said surface, a calling line including an electrical circuit, means for conveying dial pulses from said line to said recording device, control circuits connected to said recording devices whereby the completion of said circuit changes the magnetic condition of a small area of said surface, other control means actuated by each subsequent interruption of said circuit followed by a subsequent completion thereof for changing the magnetic condition of small areas of said surface, receiving means interconnected with one of said devices for changing the magnetic condition of a small area of said surface when predetermined dial pulse signals are received from said line.

15. In a dial pulse register in combination, a continuously moving surface of magnetic material having permanent magnetic properties, a plurality of recording devices located adjacent said surface, a calling line including an electrical line circuit, means for conveying dial pulses from said line to said recording devices, control circuits connected to said recording devices whereby the completion of said line circuit changes the magnetic condition of a small area of said surface, other control means actuated by each subsequent interruption of said line followed by a subsequent completion thereof for changing the magnetic condition of small areas of said surface, means for conveying signals from said calling line to said recording devices for recording the end of signaling over said calling line, and a signal receiving circuit for controlling said recording means to initiate recording the end of signaling when a predetermined pattern of said interruptions followed by subsequent completions of said line circuit is received.

References Cited in the file of this patent

UNITED STATES PATENTS 2,298,519 Tillman ---------------- Oct. 13, 1942